US011300325B2

(12) United States Patent
Branecky et al.

(10) Patent No.: US 11,300,325 B2
(45) Date of Patent: Apr. 12, 2022

(54) SYSTEM AND METHOD FOR OPERATING A GRID CONTROLLED WATER HEATER

(71) Applicant: A.O. SMITH CORPORATION, Milwaukee, WI (US)

(72) Inventors: Brian Thomas Branecky, Oconomowoc, WI (US); Yonggon Lee, Brookfield, WI (US); Kedar D. Dimble, Brookfield, WI (US)

(73) Assignee: A. O. SMITH CORPORATION, Milwaukee, WI (US)

( * ) Notice: Subject to any disclaimer, the term of this patent is extended or adjusted under 35 U.S.C. 154(b) by 563 days.

(21) Appl. No.: 16/135,377

(22) Filed: Sep. 19, 2018

(65) Prior Publication Data

US 2019/0086121 A1    Mar. 21, 2019

Related U.S. Application Data

(60) Provisional application No. 62/560,348, filed on Sep. 19, 2017.

(51) Int. Cl.
*F24H 9/20* (2006.01)
*F24H 1/18* (2022.01)
(Continued)

(52) U.S. Cl.
CPC ........... *F24H 9/2021* (2013.01); *F24H 1/185* (2013.01); *F24H 1/202* (2013.01); *F24H 2250/02* (2013.01); *G05D 23/1931* (2013.01)

(58) Field of Classification Search
CPC ........ F24H 1/185; F24H 1/202; F24H 9/2021; F24H 2250/02; G05D 23/1931
(Continued)

(56) References Cited

U.S. PATENT DOCUMENTS 8,204,633 B2    6/2012    Harbin, III et al.
8,938,311 B2    1/2015    Flohr
(Continued)

FOREIGN PATENT DOCUMENTS

WO    2015010006 A1    1/2015

OTHER PUBLICATIONS

International Search Report and Written Opinion for Application No. PCT/US2018/051676 dated Dec. 6, 2018 (15 pages).
(Continued)

*Primary Examiner* — Steven B McAllister
*Assistant Examiner* — Benjamin W Johnson
(74) *Attorney, Agent, or Firm* — Michael Best & Friedrich LLP

(57) ABSTRACT

Methods and systems for water heater system receiving electrical power from an electrical grid. The system includes an electronic processor configured to monitor an average water temperature of the water within a water tank of the system based on a first and second signal from an upper and lower temperature sensor, operate an upper heating element heating an upper portion of the tank and a lower heating element heating a lower portion of the tank in a first operation mode, receiving, via a transceiver, either an add load command or a shed load command from a grid controller, operating the upper heating element and lower heating element in a second mode in response to receiving the add load command, and operating the upper heating element and lower heating element in a third mode in response to receiving the shed load command.

18 Claims, 19 Drawing Sheets

(51) Int. Cl.
*F24H 1/20* (2022.01)
*G05D 23/19* (2006.01)

(58) Field of Classification Search
USPC ........................................................ 122/14.1
See application file for complete search history.

(56) References Cited

U.S. PATENT DOCUMENTS

| | | |
|---|---|---|
| 2009/0293816 A1 | 12/2009 | Patterson et al. |
| 2010/0187219 A1 | 7/2010 | Besore et al. |
| 2011/0058795 A1* | 3/2011 | Kleman ................ F24H 9/2021 |
| | | 392/308 |
| 2012/0222631 A1* | 9/2012 | Lesage ...................... F24H 4/04 |
| | | 122/18.5 |
| 2013/0092102 A1 | 4/2013 | Chaudhry |
| 2013/0200168 A1* | 8/2013 | Buescher .............. H05B 1/0283 |
| | | 237/8 A |
| 2014/0052307 A1 | 2/2014 | Flohr et al. |
| 2014/0214227 A1 | 7/2014 | Thornton et al. |
| 2014/0277816 A1* | 9/2014 | Branecky .............. F24H 9/2021 |
| | | 700/300 |
| 2014/0348493 A1 | 11/2014 | Kreutzman |
| 2015/0270713 A1 | 9/2015 | Steffes et al. |
| 2015/0277463 A1 | 10/2015 | Hazzard et al. |
| 2016/0187004 A1 | 6/2016 | Wheelwright |

OTHER PUBLICATIONS

International Preliminary Report on Patentability for Application No. PCT/US2018/051676 dated Apr. 2, 2020 (8 pages).

* cited by examiner

SYSTEM AND METHOD FOR OPERATING A GRID CONTROLLED WATER HEATER

RELATED APPLICATIONS

This application claims the benefit to U.S. Provisional Patent Application No. 62/560,348, filed on Sep. 19, 2017, the entire contents of which are incorporated herein by reference.

FIELD OF INVENTION

Embodiments relate to water heaters.

SUMMARY

Electric and heat pump operated water heaters use electrical energy to heat the water located inside a water tank to maintain the water within a temperature range. The electrical energy may come from a power source such as a grid, or a power grid, for example but not limited to, an energy company power grid or a home power grid including solar panels, windmills, or other energy sources. The power grid distributes electrical energy to balance supply and demand at any specific time within a specific area. The demand for electrical energy from the power grid varies with, for example, time of day, seasons, geographical area, usage, and other factors. The price for the electricity delivered by the power grid varies according to the overall demand on the power grid at a particular time and area. For example, the price of electricity increases during peak hours, and decreases during off-peak hours.

Some water heaters may include control units that control the heating elements based on the electrical energy demand, while other control units control the heating elements based on the temperature of the water with respect to a water temperature range. Furthermore, participating in programs that control the heating elements based on the electrical energy demand may, in some instances, reduce the amount of hot water that is available to the user (e.g., to conserve energy). In such instances, the user may not have sufficient hot water available for comfortable use. While some users may be able to tolerate these instances, other users may find the occasional lack of hot water unacceptable.

One embodiment provides a water heater system receiving electrical power from an electrical grid. The system includes a water tank having a vertical axis, an upper portion, and a lower portion. The system further includes an upper heating element, a lower heating element, an upper temperature sensor, a lower temperature sensor, and a control circuit. The lower heating element is disposed below the upper heating element with respect to the vertical axis. The upper heating element and the lower heating element are configured to heat water within the water tank. The upper temperature sensor is configured to produce a first signal having a relation to a water temperature within the upper portion and the lower temperature sensor is configured to produce a second signal having a relation to a water temperature within the lower portion. The control circuit includes a transceiver communicatively coupled to a grid controller and an electronic processor. The electronic processor is configured to monitor an average water temperature of the water within the water tank based on the first and second signal, operate the upper heating element and lower heating element in a first operation mode, and receive, via the transceiver, either an add load command or a shed load command. The electronic processor is further configured to operate the upper heating element and lower heating element in a second mode in response to receiving the add load command and operate the upper heating element and lower heating element in a third mode in response to receiving the shed load command.

Another embodiment provides method of operating a water heater system configured to receive electrical power from an electrical grid. The water heater system includes a water tank having a vertical axis, an upper portion and a lower portion; an upper heating element; a lower heating element disposed below the upper heating element with respect to the vertical axis, the upper heating element and the lower heating element for heating water within the water tank, an upper temperature sensor configured to produce a first signal having a relation to a water temperature within the upper portion; a lower temperature sensor configured to produce a second signal having a relation to a water temperature within the lower portion, a control circuit including a transceiver communicatively coupled to a grid controller, and an electronic processor. The method includes monitoring an average water temperature of the water within the water tank based on the first and second signal, operating the upper heating element and lower heating element in a first operation mode, receiving, via the transceiver, either an add load command or a shed load command, operating the upper heating element and lower heating element in a second mode in response to receiving the add load command, and operating the upper heating element and lower heating element in a third mode in response to receiving the shed load command.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

For ease of description, some or all of the example systems presented herein are illustrated with a single exemplar of each of its component parts. Some examples may not describe or illustrate all components of the systems. Other example embodiments may include more or fewer of each of the illustrated components, may combine some components, or may include additional or alternative components.

Figure 1:
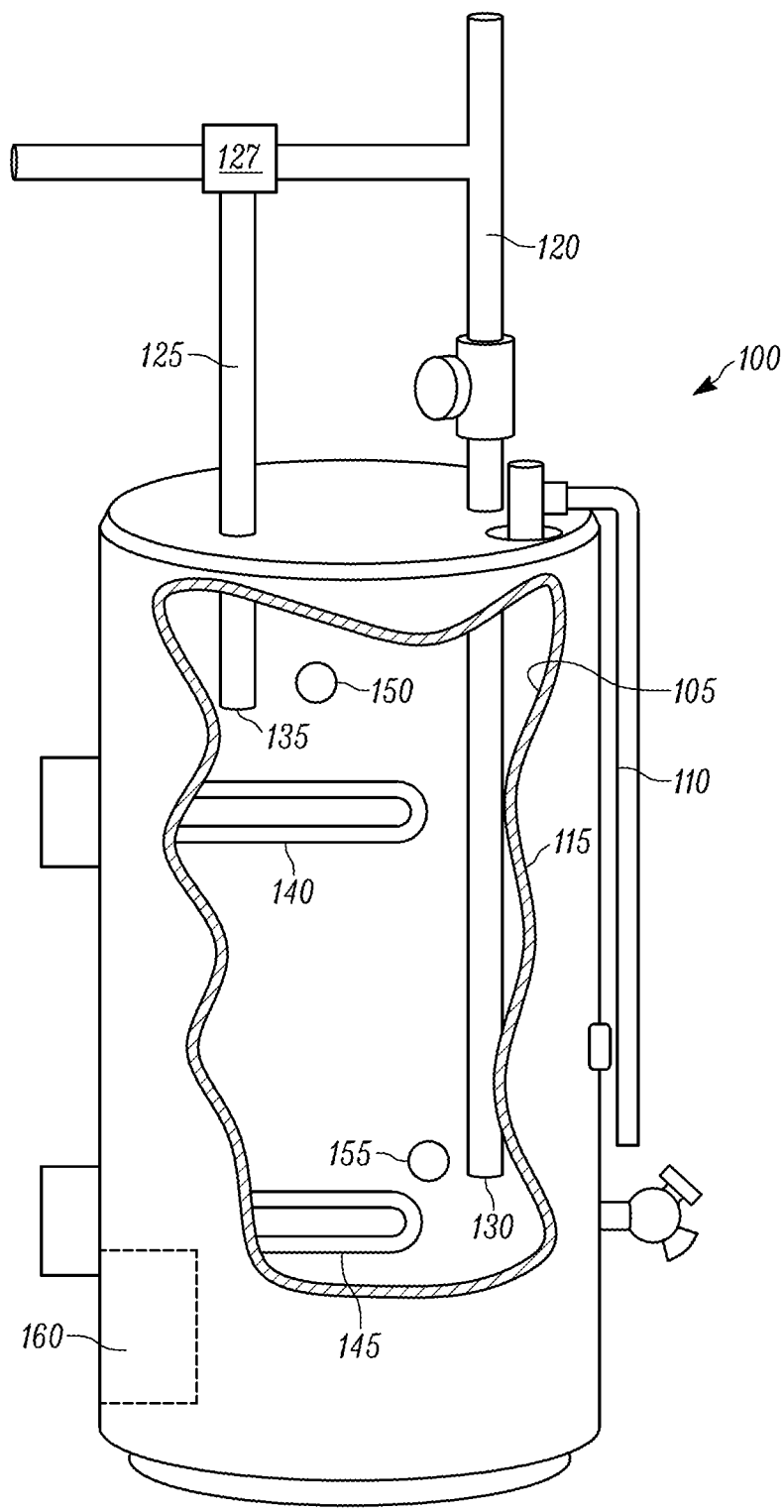
FIG. 1 is a partial exposed view of a water heater according to some embodiments of the application.

FIG. 1 is a partial exposed view of a water heater 100 according to some embodiments of the invention. The water heater 100 includes an enclosed water tank 105, a shell 110 surrounding the water tank 105, and foam insulation 115 filling an annular space between the water tank 105 and the shell 110. The water tank 105 may be made of ferrous metal and lined internally with a glass-like porcelain enamel to protect the metal from corrosion. In other embodiments, the water tank 105 may be made of other materials, such as plastic.

A water inlet line 120 and a water outlet line 125 are in fluid communication with the water tank 105 of the water heater 100. In some embodiments, the water inlet line 120 and the water outlet line 125 are in fluid communication with the water tank 105 at a top portion of the water heater 100. In other embodiments, the water inlet line 120 may be at a bottom portion of the water heater 100, while the water outlet line 125 is at the top portion of the water heater 100. The inlet line 120 includes an inlet opening 130 for adding cold water to the water tank 105, and the outlet line 125 includes an outlet opening 135 for withdrawing hot water from the water tank 105 for delivery to a user.

In some embodiments, the water heater 100 further includes a mixing valve 127. In such an embodiment, the inlet line 120 and the outlet line 125 are in fluid communication with the mixing valve 127. The mixing valve 127 may combine water from both the inlet line 120 and the outlet line 125 in order to output water at a delivery temperate setpoint. In some embodiments, the mixing valve 127 may include a sensor, such as but not limited to a water temperature sensor.

The water heater 100 may also include an upper heating element 140, a lower heating element 145, an upper temperature sensor 150, a lower temperature sensor 155, and an electronic processor 160. The upper heating element 140 is attached to an upper portion of the water tank 105 and extends into the water tank 105 to heat water within the water tank 105. The upper heating element 140 is coupled to the electronic processor 160 to receive an activation signal. When activated, the upper heating element 140 heats the water stored in an upper portion of the water tank 105. In some embodiments, the upper heating element 140 is an electric resistance heating element.

The lower heating element 145 is attached to a lower portion of the water tank 105 and extends into the water tank 105 to heat water stored in the lower portion of the water tank 105. The lower heating element 145 is coupled to the electronic processor 160 to receive an activation signal. When activated, the lower heating element 145 heats the water stored in the lower portion of the water tank 105. In some embodiments, the lower heating element 145 is an electric resistance heating element.

Although illustrated as having two heating elements 140, 145, the water heater 100 may have any number of heating elements. The invention may also be used with other fluid heating apparatus for heating a conductive fluid, such as flow-through water heater, a gas water heater, or an oil heater, as well as with other water heaters having other heater element designs and arrangements.

The upper temperature sensor 150 is positioned in the upper portion of the water tank 105 to determine an upper temperature of the water stored in the upper portion of the water tank 105. Analogously, the lower temperature sensor 155 is positioned in the lower portion of the water tank 105 to determine a lower temperature of the water in the lower portion of the water tank 105. In some embodiments, the upper temperature sensor 150 and the lower temperature sensor 155 may be coupled to an exterior or an interior surface of the water tank 105. Additionally, the upper temperature sensor 150 and the lower temperature sensor 155 may be thermistor type sensors, thermocouple type sensors, semiconductor-based sensors, resistance temperature detectors, and the like. The upper temperature sensor 150 and the lower temperature sensor 155 are coupled to the electronic processor 160 to provide temperature information (e.g., the sensed upper temperature and the sensed lower temperature) to the electronic processor 160. In some embodiments, the water tank 105 may include one or more additional temperature sensors located at various positions around the water tank 105. For example, the water tank 105 may be divided into three or more portions and a temperature sensor may be positioned in each portion. The electronic processor 160 is configured to determine the average water temperature of the tank 105. The average water temperature may be calculated based on the signals from either or both the upper temperature sensor 150 and the lower temperature sensor 155.

Figure 2:
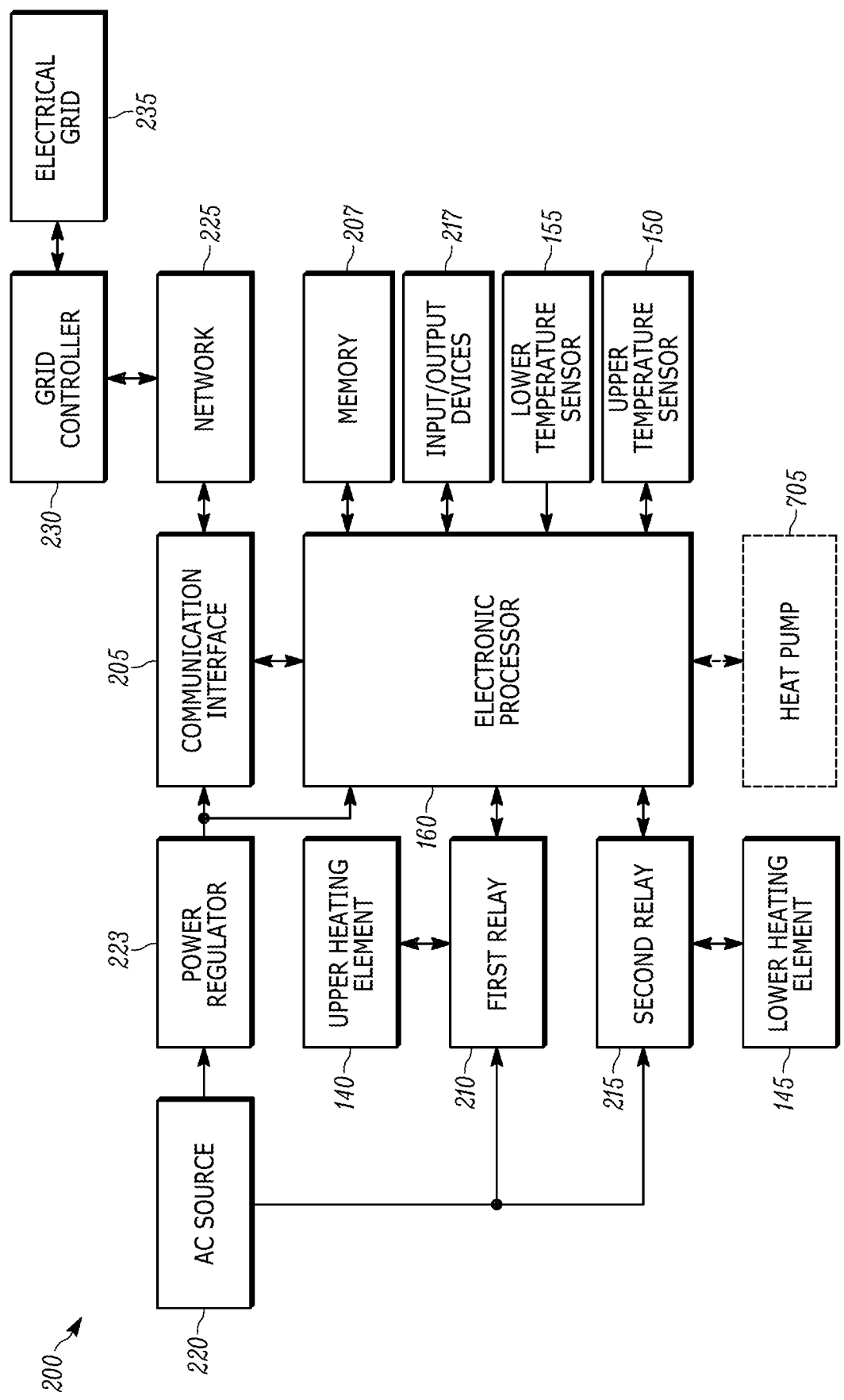
FIG. 2 is a block diagram of a control circuit of the water heater of FIG. 1 according to some embodiments of the application.

FIG. 2 is a block diagram of a control circuit 200 for the water heater 100. As illustrated in FIG. 2, the control circuit 200 includes the electronic processor 160, a communication interface 205, a memory 207, a first relay 210, a second relay 215, and input/output devices 217. The control circuit 200 receives power from an AC source 220. In one embodiment, the AC power source 220 provides 120 VAC at a frequency of approximately 50 Hz to approximately 60 Hz. In another embodiment, the AC power source 220 provides approximately 220 VAC at a frequency of approximately 50 Hz to approximately 60 Hz. In some embodiments, the control circuit 200 also includes a power regulator 223 that converts the power from the AC power source 220 to a nominal voltage (e.g., a DC voltage), and provides the nominal voltage to the control circuit 200 (e.g., the electronic processor 160, the communication terminal 205, the input/output devices 217, and the like).

The communication interface 205 communicates with a network 225 such as, for example, a WLAN, Wi-Fi network, Internet, and the like. The communication interface 205 receives one or more signals from an external controller or computing device through the network 225. As illustrated, in some embodiments, the communication interface 205 receives one or more signal from a grid controller 230. The grid controller 230 monitors an electrical grid 235 and sends one or more control signals to the water heater 100 based on the monitored electrical grid 235. In some embodiments, the grid controller 230 monitors current and/or expected demand on the electrical grid. The grid controller 230 then provides command and/or regulation signals to the water heater 100 to help monitor and balance the demand on the electrical grid 235. The grid controller 230 may provide command and/or regulation signals, for example, to increase or decrease the load from a particular consumer's water heater 100 or a set of consumer water heaters 100 (e.g., a group of water heaters 100 located in a particular geographical region), and the like. These command and/or regulation signals allow the grid controller 230 to have a more precise control over the demand on the electrical grid 235. Specifically, the grid controller 230 may send an "Add Load" command and/or a "Shed Load" command to the water heater 100. The grid controller 230 sends the "Add Load" command when excess power is available on the electrical grid 235. The grid controller 230 sends the "Shed Load" command when excess power is unavailable on the electrical grid 235. For example, when a lower temperature of the water heater 100 is warm or hot (e.g., above a threshold), the hot water requirement is determined to be low. Accordingly, the grid controller 230 may send the "Shed Load" command since the water heater 100 can reduce its energy consumption without affecting user comfort.

The communication interface 205 receives the command and/or regulation signals concerning the electrical grid through the network 225, and sends the information and/or regulation signals to the electronic processor 160. In some embodiments, the grid controller 230 is operated by the utility. In other embodiments, the grid controller 230 is operated by a third-party. In such an embodiment, the third-party may be a third-party aggregator. In such an embodiment, the third-party aggregator monitors the grid 235 independent of the utility and sends the regulation signals and/or electrical grid information to the electronic processor 160 based on such monitoring. In other embodiments, the grid controller 230 is a residential grid controller.

In such an embodiment, the grid controller 230 may be configured to monitor a home power grid. In some embodiments, in addition to, or alternatively, the grid controller 230 may provide information to the network 225, and thus the water heater 100, regarding, for example, on-peak times, off-peak times, pricing information, and the like. The water heater 100 may then operate based on the received information.

The memory 207 stores algorithms and/or programs used to control the upper heating element 140, the lower heating element 145, and other components of the water heater 100. The memory 207 may also store operational data of the water heater 100 (e.g., which heating element 140, 145 has been previously activated, historical data, usage patterns, and the like) to help control the water heater 100.

The electronic processor 160 is coupled to the memory 207, the upper temperature sensor 150, the lower temperature sensor 155, the first relay 210, the second relay 215, the communication interface 205, and the input/output device 217. The electronic processor 160 receives an upper temperature signal (e.g., the upper temperature) from the upper temperature sensor 150 and a lower temperature signal (e.g., the lower temperature) from the lower temperature sensor 155. The electronic processor 160 also receives the commands and/or electrical grid information from the network 225 through the communication interface 205. In addition, the electronic processor 160 accesses the programs, algorithms, and/or thresholds stored in the memory 207 to control the water heater 100 accordingly. Based on the received commands and/or electrical grid information, the electronic processor 160 determines an operating mode for the water heater 100 and determines appropriate temperature thresholds according to the operating mode and/or the received information from the network 225. Additionally, based on the received temperature signals, the electronic processor 160 generates and outputs a first control signal transmitted to the first relay 210, and a second control signal transmitted to the second relay 215. The first and second control signals indicate to the first relay 210 and second relay 215, respectively, when to transmit driving power to the heating elements 140, 145 (e.g., power from the AC power source 220).

The first relay 210 is further coupled to the upper heating element 140. The first relay 140 receives the first control signal via, for example, a first control terminal, from the electronic processor 160. The first relay 210 then transmits driving power, via, for example, a first power output terminal, to the upper heating element 140 according to the first control signal. The second relay 215 is further coupled to the electronic processor 160. The second relay 215 receives the second control signal via, for example, a second control terminal. The second relay 215 then transmits driving power, via, for example, a second power output terminal, to the lower heating element 145 according to the second control signal.

The input/output devices 217 output information to the user regarding the operation of the water heater 100 and also may receive input from the user. In some embodiments, the input/output devices 217 may include a user interface for the water heater 100. The input/output devices 217 may include a combination of digital and analog input or output devices required to achieve level of control and monitoring for the water heater 100. For example, the input/output devices 217 may include a touch screen, a speaker, buttons, and the like, to output information and/or receive user inputs regarding the operation of the water heater 100 (for example, a temperature setpoint at which water is to be delivered from the water tank 105). The electronic processor 160 controls the input/output devices 217 to output information to the user in the form of, for example, graphics, alarm sounds, and/or other known output devices. The input/output devices 217 may be used to control and/or monitor the water heater 100. For example, the input/output devices 217 may be operably coupled to the electronic processor 160 to control temperature settings of the water heater 100. For example, using the input/output devices 217, a user may set one or more temperature setpoints for the water heater 100.

The input/output devices 217 are configured to display conditions or data associated with the water heater 100 in real-time or substantially real-time. For example, but not limited to, the input/output devices 217 may be configured to display measured electrical characteristics of the upper heating element 140 and lower heating element 145, the temperature sensed by temperature sensors 150, 155, etc. The input/output devices 217 may also include a "power on" indicator and an indicator for each heating element 140, 145 to indicate whether the element is active.

The input/output devices 217 may be mounted on the shell of the water heater 100, remotely from the water heater 100 in the same room (e.g., on a wall), in another room in the building, or even outside of the building. The input/output device 217 may provide an interface between the electronic processor 160 and the user interface that includes a 2-wire bus system, a 4-wire bus system, and/or a wireless signal. In some embodiments, the input/output devices 217 may also generate alarms regarding the operation of the water heater 100.

In some embodiments, the input/output devices 217, the memory 207, and/or other components of the control circuit 200 are modular and separate from the electronic processor 160. In other words, some of the components of the control circuit 200 may be manufactured separately as add-on devices to be connected to the electronic processor 160. In some embodiments, the control circuit 200 is part of an electronic control device externally mounted or integrated into the water heater 100. In some embodiments, the control circuit 200 may be communicatively coupled to an external device (e.g., a wireless control panel, a smartphone, a laptop computer, and the like) through, for example, a remote network, a transceiver, and the like.

Figure 3:
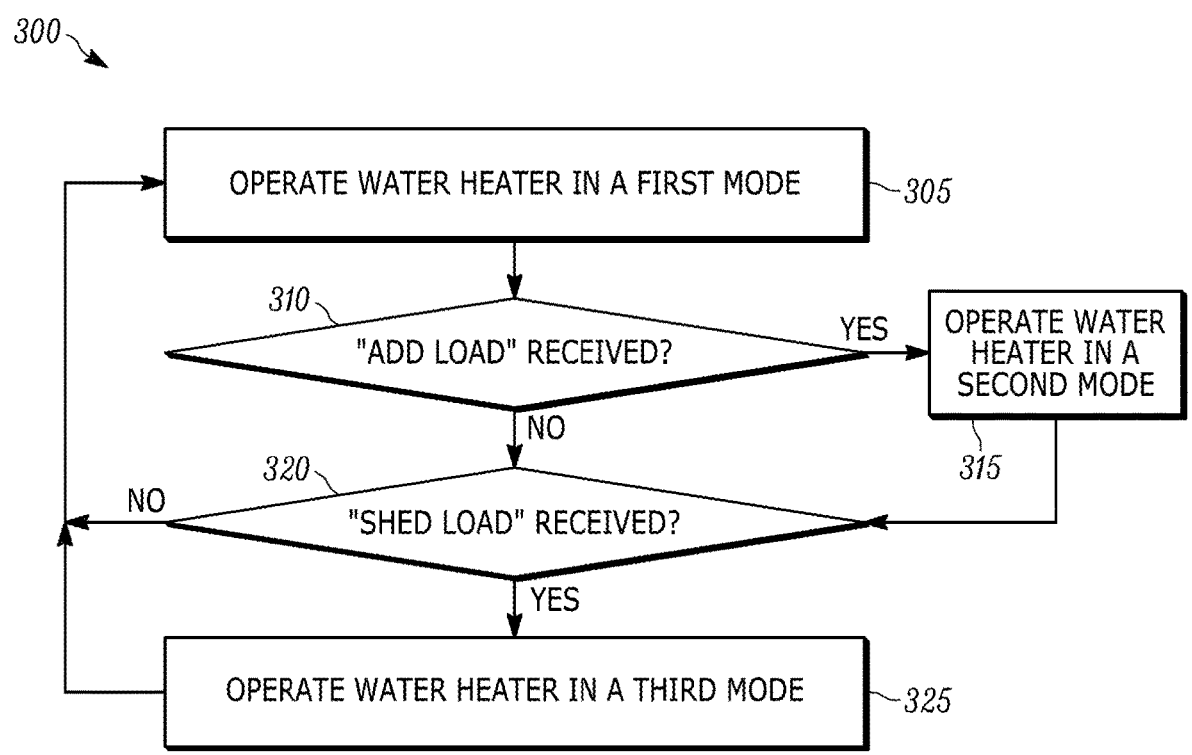
FIG. 3 is a flowchart illustrating a method of operating the water heater of FIG. 1 according to some embodiments of the application.

FIG. 3 is a flowchart illustrating a process, or method, 300 of operating the water heater 100 according to one embodiment of the application. It should be understood that the order of the steps disclosed in process 300 could vary. Additional steps may also be added to the control sequence and not all of the steps may be required. As shown in FIG. 3, initially, the water heater 100 (e.g., the electronic processor 160) operates in a first mode (step 305). In the first mode, the electronic processor 160 controls (e.g., activates and deactivates) the upper heating element 140 and the lower heating element 145 according to a first set of thresholds (e.g., an upper temperature threshold and a lower temperature threshold). The electronic processor 160 then determines whether an "Add Load" command has been received from the grid controller 230 (step 310). When the "Add Load" command has been received, the water heater 100 (e.g., the electronic processor 160) begins to operate in a second mode (step 315). During the second mode, the electronic processor 160 controls the upper heating element 140 and the lower heating element 145 according to a second set of thresholds (e.g., an second upper temperature threshold and a second lower temperature threshold) that are higher than the first set of threshold. While operating in the second mode, the electronic processor 160 continues to monitor communications through the communication interface 205, and in particular, determines whether a "Shed Load" command is received from the network 225 (step 320).

Referring back to step 310, when the "Add Load" command has not been received from the network 225, the electronic processor 160 determines whether the "Shed Load" command has been received from the network 225 (step 320). When the "Shed Load" command is not received from the network 225, the electronic processor 160 continues to operate the water heater 100 in the first mode (e.g., a normal mode) while continuing to monitor for incoming commands and/or other communications from the network 225 (step 305). Otherwise, when the "Shed Load" command is received, the electronic processor 160 operates in a third mode (e.g., a reduce mode) at step 325. During the third mode, the electronic processor 160 operates the upper heating element 140 and the lower heating element 145 according to a third set of thresholds (e.g., an third upper temperature threshold and a third lower temperature threshold) that are generally lower than the first set of thresholds. In some embodiments, the water heater 100 may operate in more than three modes based on the commands and/or other communications received from the network 225.

Figure 4:
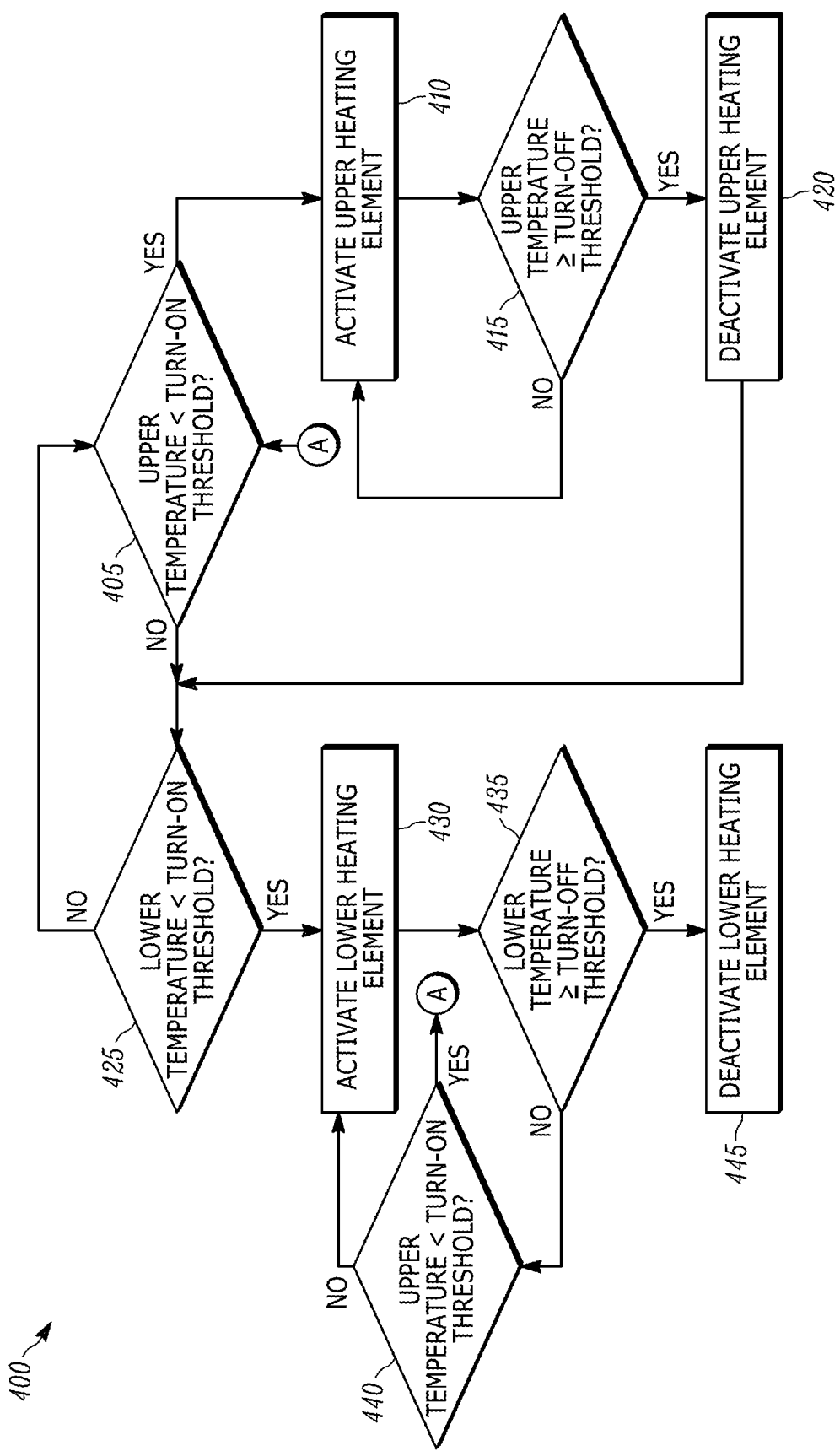
FIG. 4 is a flowchart illustrating a method of operating the water heater of FIG. 1 according to some embodiments of the application.

FIG. 4 is a flowchart illustrating a process, or method, 400 of operating the water heater 100 in a first mode (e.g., a normal mode). It should be understood that the order of the steps disclosed in process 400 could vary. Additional steps may also be added to the control sequence and not all of the steps may be required. As mentioned above, in the normal mode, the electronic processor 160 operates the upper heating element 140 and the lower heating element 145 according to a first set of thresholds (e.g., setpoints). The first set of thresholds includes a turn-off threshold that is a predetermined setpoint typically indicative of a desired temperature for the water and a turn-on threshold that is typically lower than the turn-off threshold. The turn-on threshold is calculated by the electronic processor 160 based on the turn-off threshold. In some embodiments, a user may specify (e.g., through the input/output devices 217) a desired temperature/setpoint for the water. The electronic processor 160 may then calculate the turn-on threshold/setpoint and the turn-off threshold based on the water temperature desired by the user. In other embodiments, the user may simply choose between a set of heating options such as, for example, VERY HIGH, HIGH, LOW, and the like. The electronic processor 160 may then determine appropriate turn-off and turn-on thresholds based on the setting selected by the user.

As shown in FIG. 4, the electronic processor 160 determines whether the upper temperature (i.e., the water temperature received from the upper temperature sensor 150) is below (e.g., drops below) the turn-on threshold (step 405). The turn-on threshold is, in this embodiment, a first difference threshold being approximately 15° F. lower than the turn-off threshold. When the upper temperature is less than the turn-on threshold, the electronic processor 160 activates the upper heating element 140 (step 410). As discussed above, the electronic processor 160 activates the upper and lower heating elements 140, 145 by sending the appropriate signals to the first and second relay 210, 215, respectively. The electronic processor 160 then determines whether the upper temperature is greater than or equal to the turn-off threshold (step 415). When the upper temperature has not reached the turn-off threshold, the electronic processor 160 continues to activate the upper heating element 140 (step 410). On the other hand, when the upper temperature reaches the turn-off threshold, the electronic processor 160 deactivates the upper heating element 140 (step 420) and proceeds to determine whether the lower temperature (i.e., the water temperature received from the lower temperature sensor 155) is less than the turn-on threshold (step 425).

Referring back to step 405, when the upper temperature is not below the turn-on threshold, the electronic processor 160 determines whether the lower temperature is below the turn-on threshold (step 425). When the lower temperature is not below the turn-on threshold, the electronic processor 160 continues to monitor the upper temperature and the lower temperature with respect to the turn-on threshold and the turn-off threshold (step 405). On the other hand, when the lower temperature is lower than the turn-on threshold, the electronic processor 160 activates the lower heating element 145 (step 430). The electronic processor 160 then determines whether the lower temperature is greater than or equal to the turn-off threshold (step 435). When the lower temperature has not yet reached the turn-off threshold, the electronic processor 160 determines whether the upper temperature has dropped below the turn-on threshold (step 440). By checking the upper temperature at this point priority is given to the upper heating element 140. Therefore, even if the lower temperature is below the turn-on threshold, when the upper temperature is also below the turn-on threshold, the upper heating element 140 is activated before the lower heating element 145. Accordingly, when the upper temperature has dropped below the turn-on threshold, the electronic processor 160 returns to step 405 to control the upper heating element 140. Otherwise, when the upper temperature has not dropped below the turn-on threshold, the electronic processor 160 continues to activate the lower heating element 145. Referring back to step 435, when the lower temperature has reached the turn-off threshold, the electronic processor 160 deactivates the lower heating element 145 (step 445) and continues to monitor the upper temperature and the lower temperature to turn on the upper heating element 140 or the lower heating element 145 accordingly (step 405).

The difference between the turn-on threshold and the turn-off threshold provides a hysteresis for the first relay 210 and the second relay 215 to reduce the number of switches made by each. For example, rather than immediately activating the first relay 210 and/or the second relay 215 when the water temperature drops below the turn-off threshold, the operation of the first and second relays 210, 215 does not change (e.g., the relays are not switched) until the water temperature drops below the turn-on threshold. By introducing this hysteresis range, the number of switches performed by the first relay 210 and the second relay 215 are reduced, thereby extending the lifetime of the relays 210, 215 and the water heater 100.

Figure 5:
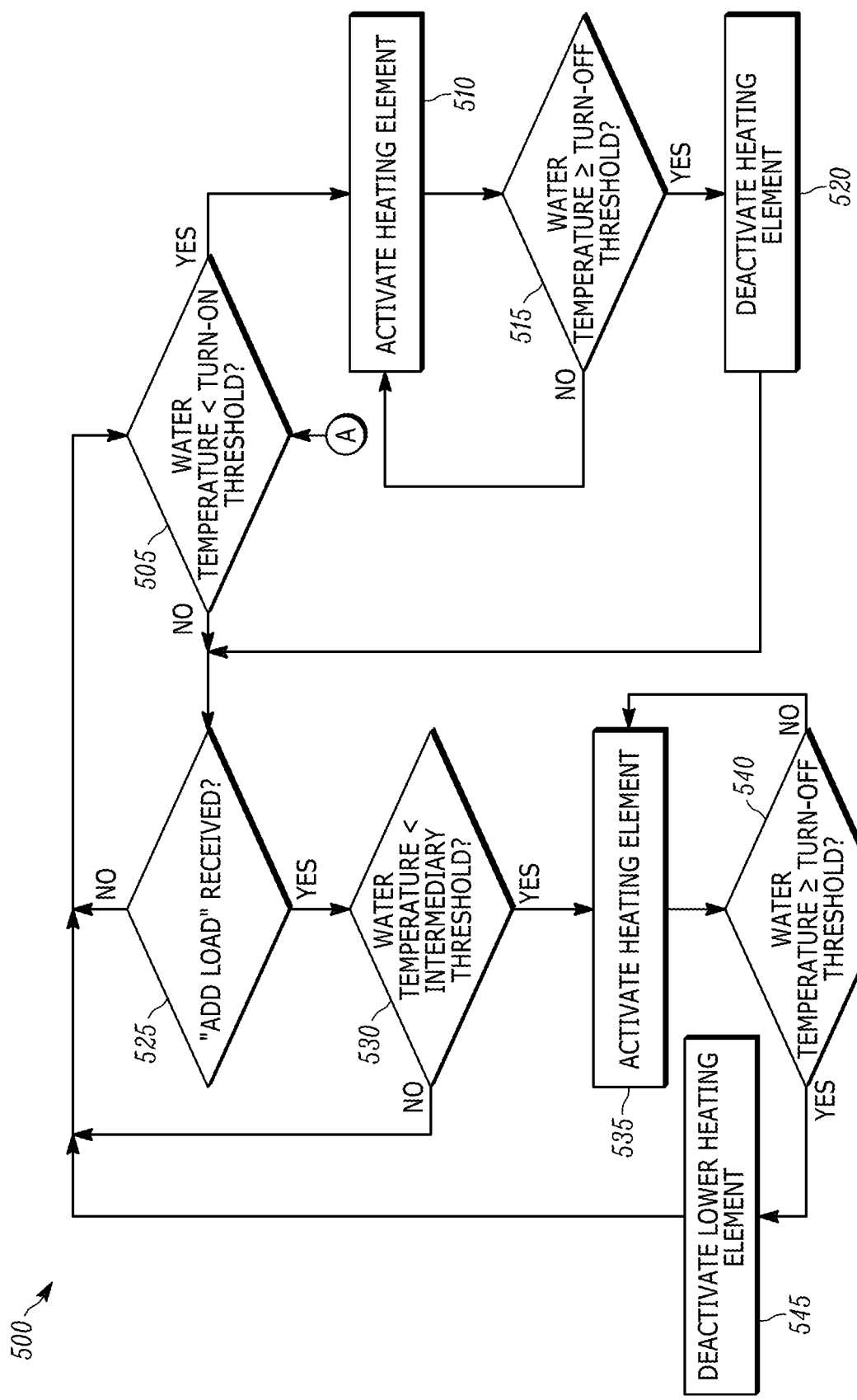
FIG. 5 is a flowchart illustrating a method of operating the water heater of FIG. 1 according to some embodiments of the application.

FIG. 5 is a flowchart illustrating a process, or method, 500 of transitioning from the first mode to the second mode. It should be understood that the order of the steps disclosed in process 500 could vary. Additional steps may also be added to the control sequence and not all of the steps may be required. As shown in FIG. 5, initially the water heater 100 operates in the first mode and determines whether the water temperature is below the turn-on threshold (step 505). When the water temperature is below the turn-on threshold, the electronic processor 160 activates the appropriate heating element 140, 145 (step 510). The electronic processor 160 monitors the water temperature and determines whether the water temperature is greater than or equal to the turn-off threshold (step 515). When the water temperature reaches the turn-off threshold, the electronic processor 160 deactivates the heating element 140, 145 (step 520) and determines whether the "Add Load" command has been received (step 525). On the other hand, when the water temperature has not reached the turn-off threshold, the electronic processor 160 continues to activate the heating element (step 510).

When the electronic processor 160 has not received the "Add Load" command, the electronic processor 160 continues to operate the heating elements 140, 145 according to the first set of thresholds by proceeding to step 505. When the electronic processor 160 receives the "Add Load" command, the electronic processor 160 determines whether the water temperature is below an intermediary threshold (step 530). The intermediary threshold is a modified turn-on threshold. The intermediary threshold is higher than the turn-on threshold. In this example, the intermediary threshold is approximately 8° F. to 12° F. (e.g., 10° F.) higher than the turn-on threshold used in the normal mode of operation. In other embodiments, however, the difference between the turn-on threshold and the intermediary threshold may be higher or lower based on the specific design of the water heater 100. Activating the heating elements 140, 145 based on an increased turn-on threshold (i.e., the intermediary threshold) allows the water heater 100 to store excess electrical energy from the electrical grid in the form of heat energy. While higher than the turn-on threshold, the intermediary threshold remains lower than the turn-off threshold, which ensures that the hot water delivered to the user remains within an acceptable usage range.

When the electronic processor 160 determines that the water temperature is below the intermediary threshold, the electronic processor 160 activates the appropriate heating element 140, 145 (step 535). Otherwise, the electronic processor 160 returns to operating in the normal mode (step 505), but may return to comparing the water temperature to the intermediary threshold (step 530) when the "Add Load" command remains active. After activating the appropriate heating element 140, 145, the electronic processor 160 compares the (average) water temperature to the turn-off threshold (step 540). In the illustrated embodiment, the turn-off threshold remains the same whether the water heater 100 operates in the normal mode or the second mode, even when the turn-on threshold is modified to be slightly higher. However, in other embodiments, the turn-on threshold and the turn-off threshold may both be changed (e.g., increased) during the second mode to take a greater advantage of the excess energy of the electrical grid. When the electronic processor 160 determines that the water temperature is greater than or equal to the turn-off threshold, the electronic processor 160 deactivates the heating element 140, 145 (step 545), and returns to the normal mode of operation (step 505). On the other hand, when the electronic processor 160 determines that the water temperature is below the turn-off threshold, the electronic processor 160 maintains the heating element 140, 145 activated (step 535).

Figure 6:
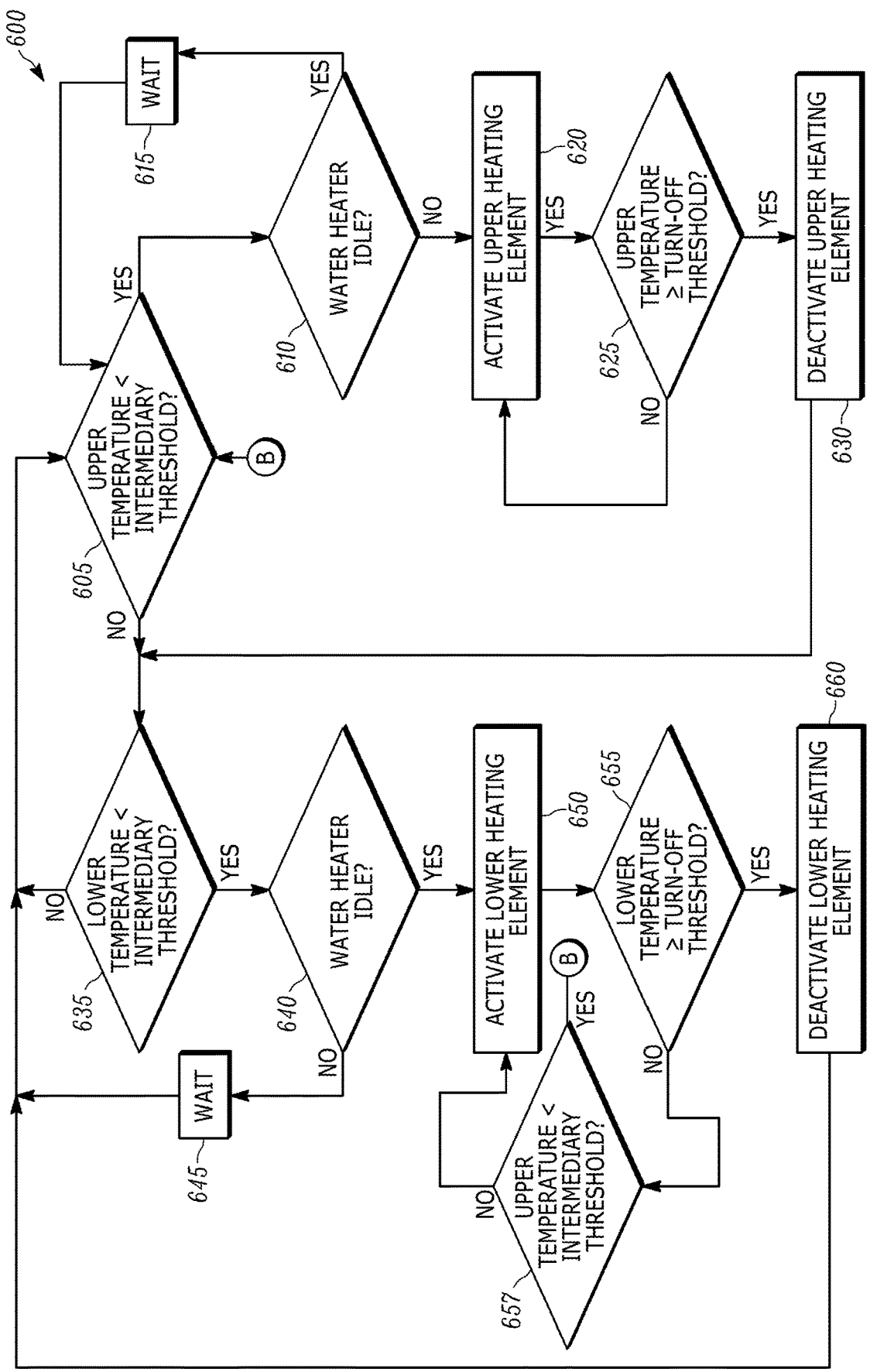
FIG. 6 is a flowchart illustrating a method of operating the water heater of FIG. 1 according to some embodiments of the application.
Figure 7:
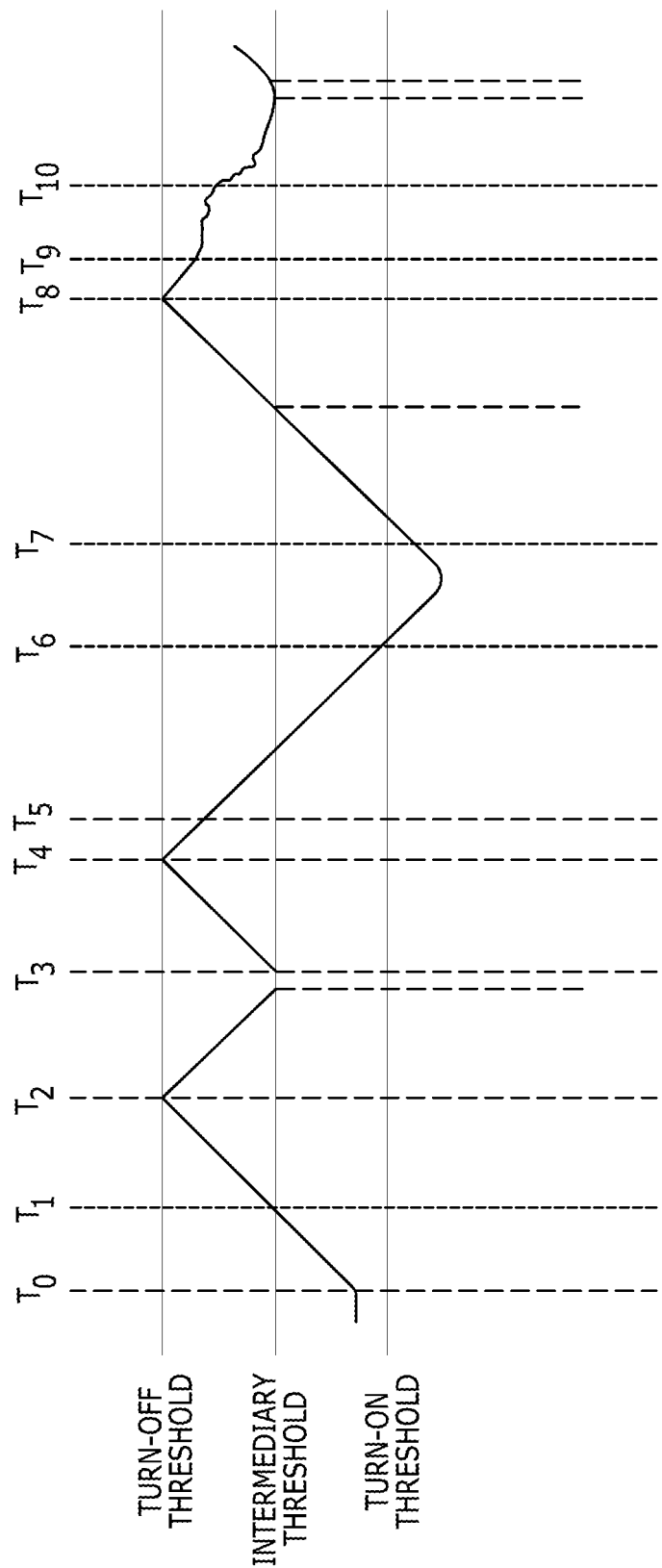
FIG. 7 is an exemplary graph illustrating an operation of the water heater of FIG. 1 according to some embodiments of the application.

FIG. 6 is a flowchart illustrating a process, or method, 600 of operating in the second mode. It should be understood that the order of the steps disclosed in process 600 could vary. Additional steps may also be added to the control sequence and not all of the steps may be required. FIG. 7 is a graph of the upper temperature over time generally illustrating the operation of the water heater in the second mode and will be referred to throughout the description of the process 600. As shown in FIG. 6, the electronic processor 160 determines whether the upper temperature is below the intermediary threshold (step 605). As discussed above, in the illustrated embodiment, the intermediary threshold is approximately 3° F.-7° F. (e.g., 5° F.) lower than the turn-off threshold and 8° F.-12° F. (e.g., 10° F.) higher than the turn-on threshold used in the normal mode of operation. When the electronic processor 160 determines that the upper temperature is below the intermediary threshold, the electronic processor 160 then determines whether the water heater 100 is idle after completing a heating cycle (step 610).

A heating cycle refers to the activation of the upper heating element 140 or the lower heating element 145 for the average water temperature to reach the turn-off threshold. When the average water temperature reaches the turn-off threshold, the water heater 100 deactivates the heating elements 140, 145 and is considered to be idle. When the water heater 100 is idle after completing a heating cycle, the electronic processor 160 waits for a predetermined period (step 615) and returns to step 605 to determine if the upper temperature remains below the intermediary threshold. On the other hand, when the water heater 100 is not idle, the electronic processor 160 activates the upper heating element 140 (step 620). While the upper temperature remains below the intermediary threshold, and the electronic processor 100 operates in the second mode, the electronic processor 160 enables "forced heating" for the upper heating element 140. In other words, the upper heating element 140 is activated even though under the normal mode, the heating element 140 would not be activated (e.g., because the turn-on threshold is lower than the intermediary threshold). In the example of FIG. 7, the upper temperature is below the intermediary threshold between $T_0$ and $T_1$. Therefore, during this time, the upper heating element 140 is activated and the upper temperature begins to rise (between $T_0$ and $T_2$). The upper heating element 140 would not have been activated in the normal mode because at time $T_0$, the upper temperature is above the turn-on threshold. Therefore between $T_0$ and $T_1$, the electronic processor 160 is "force heating" the upper heating element 140, as discussed above.

The electronic processor 160 then proceeds to determine whether the upper temperature has reached the turn-off threshold (step 625). When the electronic processor 160 determines that the upper temperature has not yet reached the turn-off threshold, the electronic processor 160 maintains the upper heating element 140 activated (step 620). In the example of FIG. 7, the upper heating element 140 continues to be activated between $T_1$ and $T_2$ because the turn-off threshold has not yet been reached. On the other hand, when the electronic processor 160 determines that the upper temperature has reached the turn-off threshold, the electronic processor 160 deactivates the upper heating element 140 (step 630), and proceeds to determine whether the lower temperature (i.e., water temperature from the lower temperature sensor 155) is below the intermediary threshold (step 635). As shown in FIG. 7, when the upper temperature reaches the turn-off threshold at time $T_2$, the upper heating element 140 is deactivated and the upper temperature begins to decline. Additionally, between $T_2$ and $T_3$, the upper temperature, though decreasing, remains above the intermediary threshold. Because, during the second mode, the upper heating element 140 is not activated until the upper temperature drops below the intermediary threshold, between time $T_2$ and $T_3$, the upper heating element 140 remains inactive and the upper temperature begins to decline. At time $T_3$, however, the upper temperature crosses the intermediary threshold and thus the upper heating element 140 is reactivated until once again reaching the turn-off threshold at time $T_4$.

Referring back to step 605, when the electronic processor 160 determines that the upper temperature is not below the intermediary threshold, the electronic processor 160 determines whether the lower temperature is below the intermediary threshold (step 635). When the electronic processor 160 determines that the lower temperature is not below the intermediary threshold, the electronic processor 160 continues to monitor the upper and lower temperatures with respect to the intermediary threshold (step 605). When, on the other hand, the electronic processor 160 determines that the lower temperature is below the intermediary threshold, the electronic processor 160 then determines whether the water heater 100 is idle after completing a heating cycle as described above with respect to step 610 (step 640). When the electronic processor 160 determines that the water heater 100 is idle, the electronic processor 160 waits for a predetermined period (step 645) and returns to step 605 to continue monitoring the upper and lower temperatures. When the electronic processor 160 determines that the water heater 100 is not idle, the electronic processor 160 proceeds to activate the lower heating element 145 (step 650). While the lower temperature remains below the intermediary threshold and the electronic processor 100 operates in the second mode, the electronic processor 100 enables "forced heating" for the lower heating element 145. In other words, the lower heating element 145 is activated even though under the normal mode, the lower heating element 145 would not be activated (e.g., because the turn-on threshold is lower than the intermediary threshold).

The electronic processor 160 then proceeds to determine whether the lower temperature has reached the turn-off threshold (step 655). When the electronic processor 160 determines that the lower temperature has not yet reached the turn-off threshold, the electronic processor 160 determines whether the upper temperature has dropped below the intermediary threshold (step 657) to maintain the priority of providing heat via the upper heating element 140. When the electronic processor 160 determines that the upper temperature has dropped below the intermediary threshold, the electronic processor 160 proceeds to step 605. Otherwise, when the electronic processor 160 determines that the upper temperature remains above the intermediary threshold, the electronic processor 160 continues to activate the lower heating element 140 (step 650). Referring back to step 655, when the electronic processor 160 determines that the lower temperature has reached the turn-off threshold, the electronic processor 160 deactivates the lower heating element 145 (step 660), and returns to step 605 to continue monitoring the upper and lower temperatures with respect to the intermediary threshold. It should be understood that if during the execution of method 600, the electronic processor 160 receives a command indicating an end of the second mode (or stops sending the "Add Load" command, the electronic processor 160 reverts to operating in the normal mode as shown in FIG. 5.

In the example of FIG. 7, a stop command is sent from the network 225 at time $T_5$, thereby stopping the operation of the water heater 100 in the second mode. Thus, between $T_5$ and $T_7$, when the water heater 100 operates in the normal mode, the upper and lower heating elements 140, 145 remain inactive, until the upper temperature drops below the turn-on threshold at time $T_6$. At time $T_6$, the upper heating element 140 is activated and the upper temperature begins to increase. In the example of FIG. 7, another "Add Load" command is received at time $T_7$. Since at time $T_7$, the upper heating element 140 is already activated, the electronic processor 160 maintains the upper heating element 140 active until the upper temperature reaches the turn-off threshold again at time $T_8$. The "Add Load" command is stopped at time $T_9$ and then restarted at time $T_{10}$.

Figure 8:
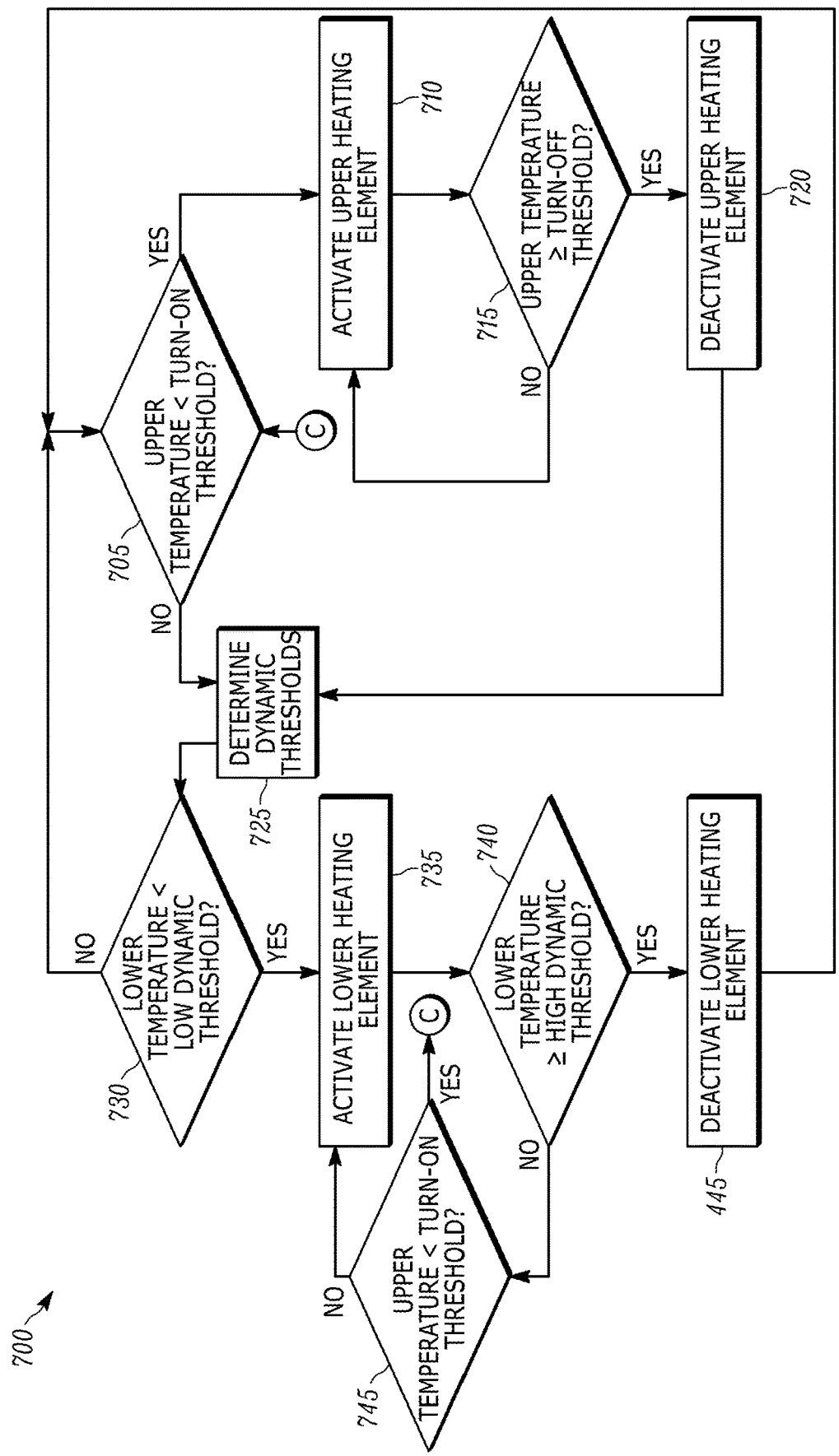
FIG. 8 is a flowchart illustrating a method of operating the water heater of FIG. 1 according to some embodiments of the application.

FIG. 8 is a flowchart illustrating a first process, or method, 700 of operating in the third mode (e.g., a reduce mode). It should be understood that the order of the steps disclosed in process 700 could vary. Additional steps may also be added to the control sequence and not all of the steps may be required. As shown in FIG. 8, the electronic processor 160 determines whether the upper temperature is below the turn-on threshold (step 705). When the electronic processor 160 determines that the upper temperature is below the turn-on threshold, the electronic processor 160 activates the upper heating element 140 (step 710). The electronic processor 160 then continues to monitor the upper temperature and determines whether the upper temperature has reached the turn-off threshold (step 715). When the electronic processor 160 determines that the upper temperature has not yet reached the turn-off threshold, the electronic processor 160 maintains the upper heating element 140 activated (step 710). On the other hand, when the electronic processor 160 determines that the upper temperature has reached the turn-off threshold, the electronic processor 160 deactivates the upper heating element 140 (step 720). The electronic processor 160 proceeds to determine a set of dynamic thresholds for control of the lower heating element 145 (step 725).

Figure 13:
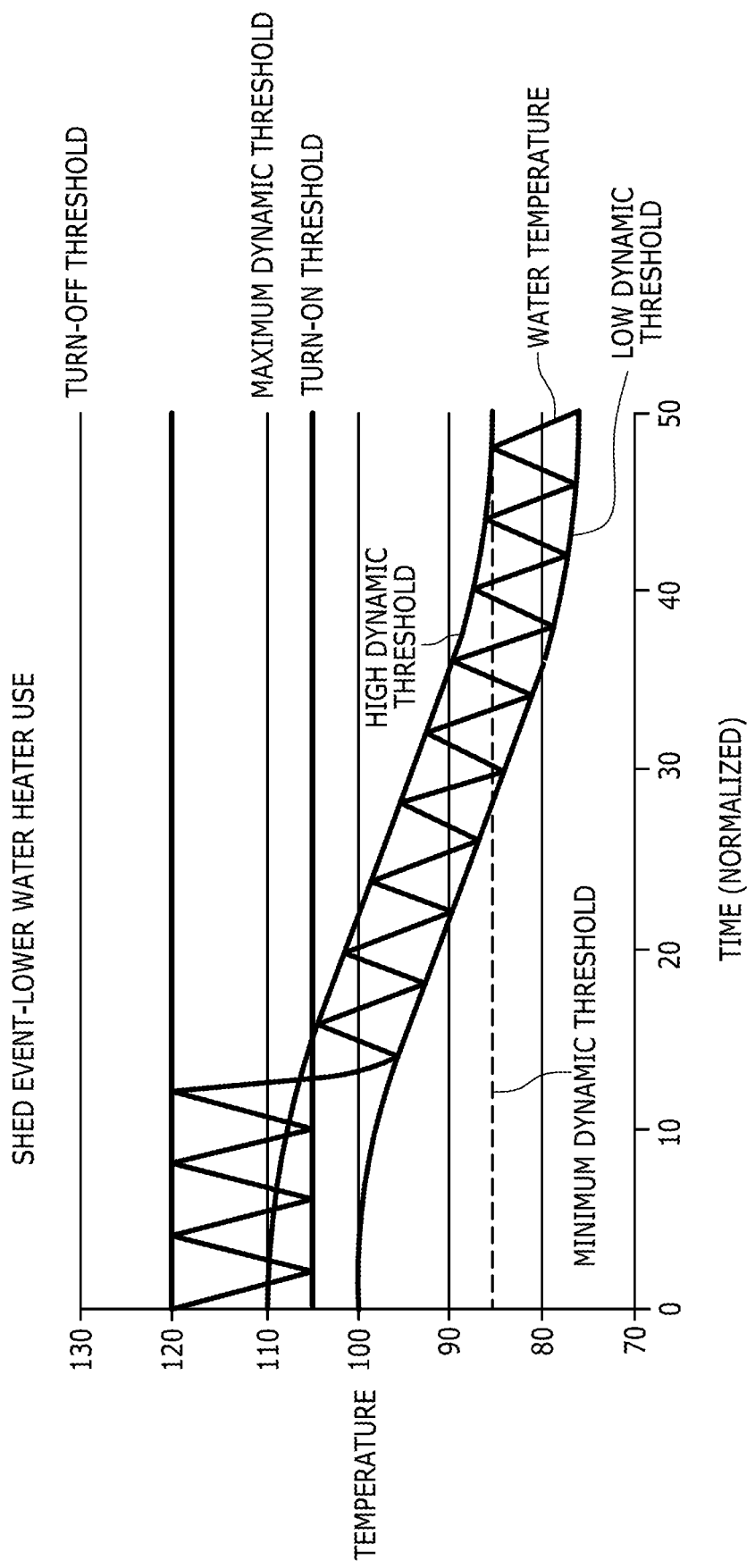
FIG. 13 is an exemplary graph illustrating an operation of the water heater of FIG. 1 according to some embodiments of the application.
Figure 14:
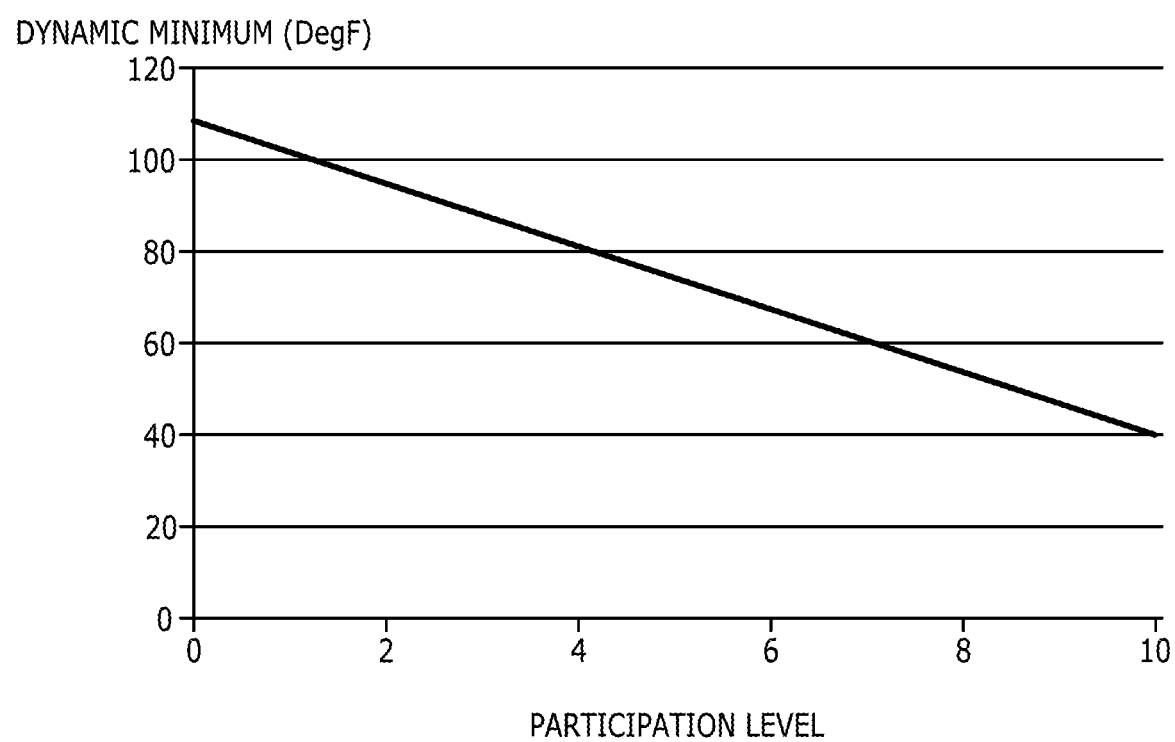
FIG. 14 is an exemplary graph illustrating a relationship between participation levels and a minimum dynamic threshold.

Referring back to step 705, when the electronic processor 160 determines that the upper temperature is not below (e.g., greater than or approximately equal to) the turn-on threshold, the electronic processor 160 proceeds to step 725 to determine the set of dynamic thresholds for control of the lower heating element 145, as explained in more detail in FIGS. 12-14. The set of dynamic thresholds is significantly lower than the turn-on and turn-off thresholds. In the illustrated embodiment, the dynamic thresholds may be approximately 35° F. lower than the turn-on and turn-off thresholds. In other embodiments, however, the dynamic thresholds may be more or less removed from the turn-on and turn-off thresholds. The set of dynamic thresholds includes a low dynamic threshold and a high dynamic threshold. The low dynamic threshold is lower than the high dynamic threshold. As explained in more detail below, the low and high dynamic threshold may change based on, for example, which heating elements 140, 145 are activated in previous heating cycles, a participation level of a user, and the like.

After the low dynamic threshold and the high dynamic threshold have been determined, the electronic processor 160 determines whether the lower temperature is below the low dynamic threshold (step 730). When the electronic processor 160 determines that the lower temperature is not below the low dynamic threshold, the electronic processor 160 continues to monitor the upper and lower temperatures with respect to the turn-on threshold and the low dynamic threshold, respectively (step 705). On the other hand, when the electronic processor 160 determines that the lower temperature is below the low dynamic threshold, the electronic processor 160 activates the lower heating element 145 (step 735). The electronic processor 160 continues to monitor the lower temperature and determines whether the lower temperature has reached (e.g., is greater than or approximately equal to) the high dynamic threshold (step 740). When the electronic processor 160 determines that the lower temperature has not reached the high dynamic threshold, the electronic processor 160 determines whether the upper temperature has dropped below the turn-on threshold (step 745). When the electronic processor 160 determines that the upper temperature is below the turn-on threshold, the electronic processor 160 proceeds to step 705 to control (e.g., activate and deactivate) the upper heating element 140 and suspends control of the lower heating element 145. On the other hand, when the electronic processor 160 determines that the upper temperature remains greater than or approximately equal to the turn-on threshold, the electronic processor 160 continues to activate the lower heating element 145 (step 735). Referring back to step 740, when the electronic processor 160 determines that the lower temperature has reached the high dynamic threshold, the electronic processor 160 deactivates the lower heating element 145 (step 750) and continues to monitor the upper and lower temperatures by proceeding to step 705.

Although process 700 was described with respect to only the upper heating element 140 and the lower heating element 145, in some embodiments, the water heater 100 may also include a heat pump 705 (shown in phantom in FIG. 2). In such embodiments, a coil for the heat pump 705 is positioned in the lower portion of the tank 105 proximate to the lower heating element 145. In other words, the heat pump 705 heats the water in the lower portion of the tank 105. However, compared to the lower heating element 145, in some embodiments, the heat pump 705 heats water at a slower rate than the lower heating element 145. Therefore, when the water heater 100 operates in the third mode (e.g., reduced mode), the thresholds used to control the heat pump 705 may be different than the turn-on and turn-off thresholds, and the dynamic thresholds. For example, when operating the water heater 100 in the first mode, the electronic processor 160 may be configured to activate the heat pump 705 when the (average) water temperature of the tank 105 falls below the turn-on threshold and deactivate the heat pump when the water temperature exceeds a second difference threshold. The second difference threshold may be, for example, approximately 7° F. below the turn-off threshold.

Figure 9:
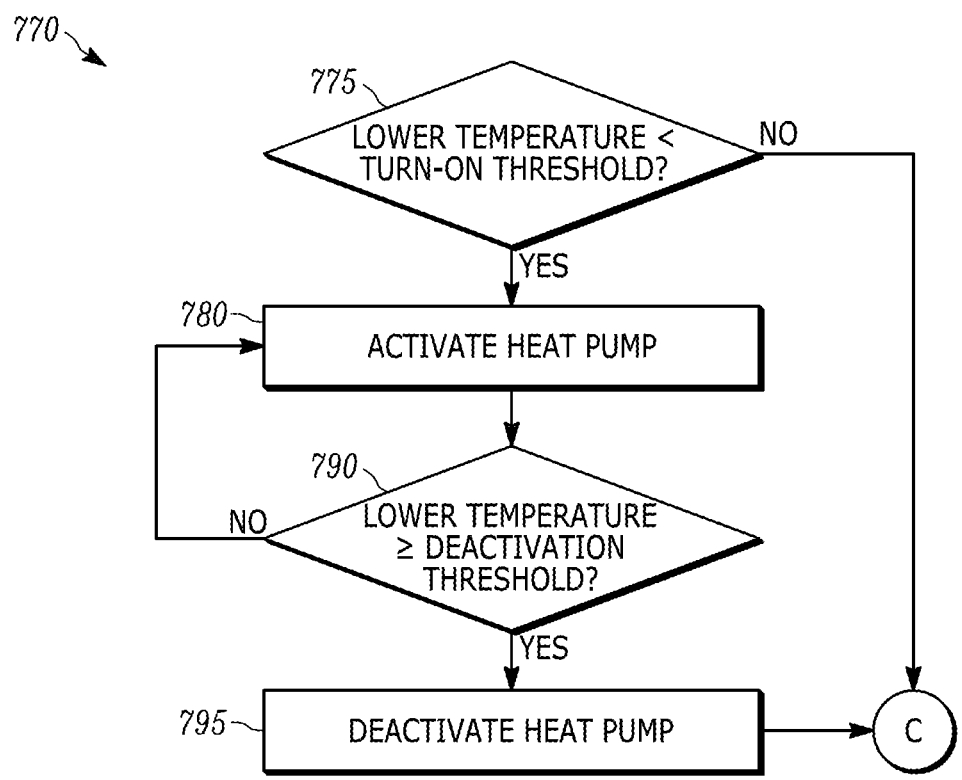
FIG. 9 is a flowchart illustrating a method of operating a water heater having a heat pump according to some embodiments of the application.

FIG. 9 is a flowchart illustrating a process, or method, 770 of operating the water heater 100 having a heat pump 705 in the third mode. It should be understood that the order of the steps disclosed in process 770 could vary. Additional steps may also be added to the control sequence and not all of the steps may be required. As shown in FIG. 9, initially, the electronic processor 160 determines whether the lower temperature is below the turn-on threshold (step 775). When the electronic processor 160 determines that the lower temperature is below the turn-on threshold, the electronic processor 160 activates the heat pump 705 (step 780). The electronic processor 160 continues to monitor the lower temperature and determines whether the lower temperature is above a deactivation threshold (step 790). The deactivation threshold is below the turn-off threshold, but still higher than the turn-on threshold. Therefore, when the upper heating element 140 and the heat pump 705, if available (present in the system 100), are activated at the same time, the heat pump 705 turns off earlier than the upper heating element 140.

When the electronic processor 160 determines that the lower temperature has reached the deactivation threshold, the electronic processor 160 proceeds to deactivate the heat pump 705 (step 795). The electronic processor 160 continues to monitor the upper and lower temperatures as described by FIG. 8, for example, by proceeding to step 705. Referring back to step 790, when the electronic processor 160 determines that the lower temperature has not reached the deactivation threshold, the electronic processor 160 continues to activate the heat pump 705 (step 780). Referring back to step 775, when the electronic processor 160 determines that the lower temperature is not below the turn-on threshold, the electronic processor 160 proceeds to step 705 of FIG. 8 to continue to control the upper and lower heating elements 140, 145. Further, step 775 may be performed after the electronic processor 160 deactivates the upper heating element 140 (e.g., step 720 of FIG. 8) and/or in parallel of controlling the upper and lower heating elements 140, 145, respectively.

Figure 10:
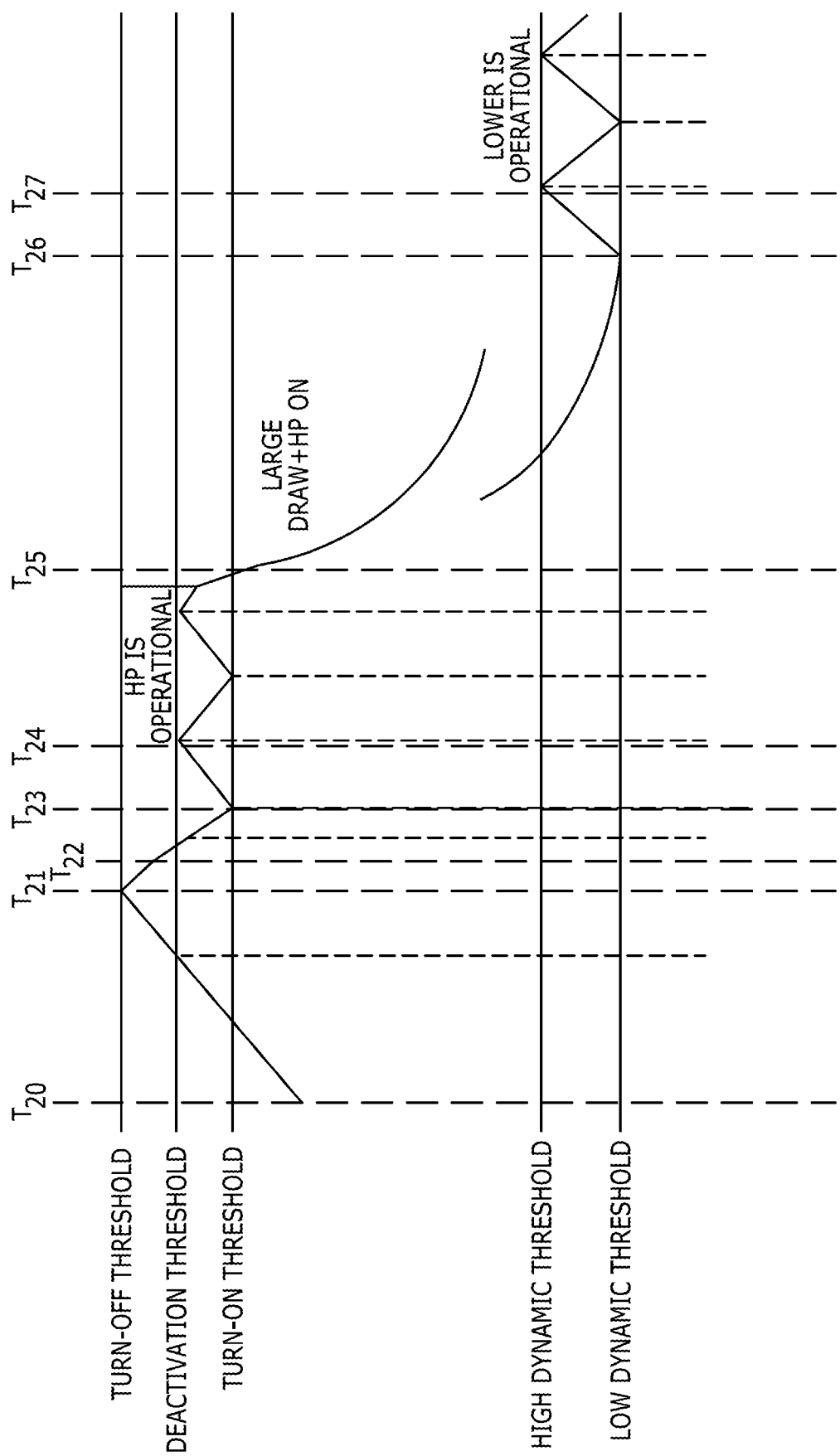
FIG. 10 is an exemplary graph illustrating the operation of FIG. 1 according to some embodiments of the application.

FIG. 10 is a graph illustrating the lower temperature over time. FIG. 10 generally illustrates the operation of the water heater 100 having the heat pump 705 in the third mode. In the example of FIG. 10, the water heater 100 operates in the normal mode between time $T_{20}$ and $T_{22}$. Therefore, when the lower temperature is below the turn-on threshold at time $T_{20}$, the electronic processor 160 activates the lower heating element 145 as discussed for example, in step 430 of FIG. 3. The lower heating element 145 remains activated until the lower temperature reaches the turn-off threshold at time $T_{21}$. At time $T_{21}$, the electronic processor 160 deactivates the lower heating element 145 as described with respect to step 435 of FIG. 3. At time $T_{22}$, however, the electronic processor 160 receives a "Shed Load" command. Upon receipt of the "Shed Load" command, the lower heating element 145 is controlled by the low dynamic threshold and the high dynamic threshold. In the example of FIG. 10, the low dynamic threshold corresponds to approximately 80° F. and the high dynamic threshold corresponds to approximately 90° F. At time $T_{23}$, when the lower temperature drops to the turn-on threshold, the electronic processor 160 activates the heat pump 705 as described in step 780 of FIG. 9, but does not activate the lower heating element 145 due to the reduced dynamic thresholds. The heat pump 705 remains activated until the lower temperature reaches the deactivation threshold at time $T_{24}$. At time $T_{24}$, the electronic processor 160 deactivates the heat pump 705 as described with respect to step 795 of FIG. 9. Between time $T_{22}$ and time $T_{25}$, the operation of the heat pump 705 maintains the lower temperature between the turn-on threshold and the deactivation threshold. However, at time $T_{25}$, a large water draw causes the lower temperature to decrease rapidly. Between time $T_{25}$ and time $T_{26}$, the heat pump 705 remains active, but the heat provided by the heat pump 705 is insufficient to maintain the lower temperature above the turn-on threshold.

In the example of FIG. 10, the water draw is sufficiently large and causes the lower temperature to reach the low dynamic threshold at time $T_{26}$. At time $T_{26}$, the electronic processor 160 activates the lower heating element 145, and the lower temperature begins to increase, as described with respect to step 735 of FIG. 8. The electronic processor 160 then deactivates the lower heating element 145 when the lower temperature reaches the high dynamic threshold at time $T_{27}$. As shown in FIG. 10, the activation of the lower heating element 145 maintains the lower temperature between the low dynamic threshold and the high dynamic threshold.

Figure 11:
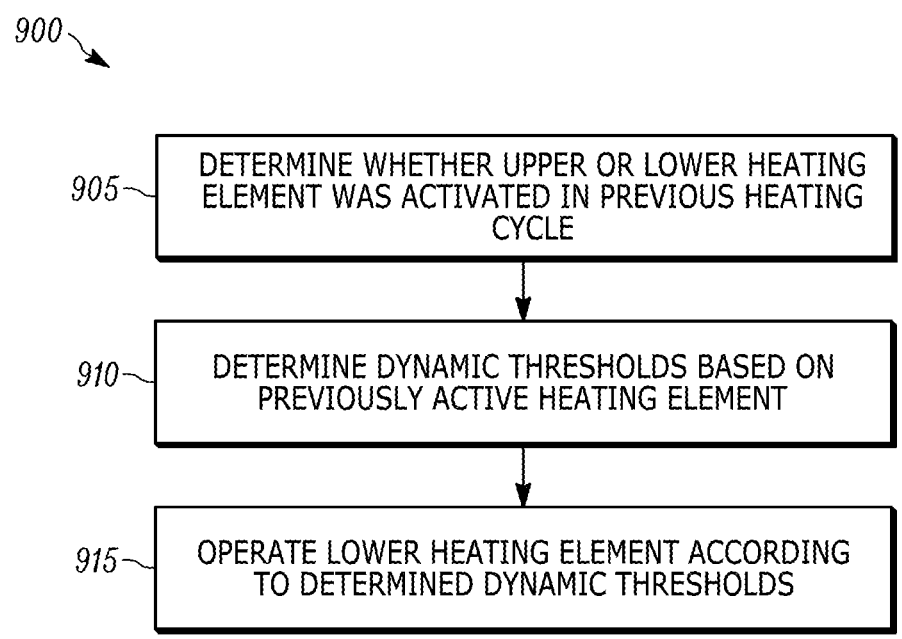
FIG. 11 is a flowchart illustrating a method of operating the water heater of FIG. 1 according to some embodiments of the application.

FIG. 11 is a flowchart illustrating a process, or method, 900 for determining the dynamic thresholds. It should be understood that the order of the steps disclosed in process 900 could vary. Additional steps may also be added to the control sequence and not all of the steps may be required. First, as shown in FIG. 11, the electronic processor 160 determines whether the upper heating element 140 or the lower heating element 145 was activated during the last heating cycle (step 905). The electronic processor 160 then determines a set of dynamic thresholds (e.g., a low dynamic threshold and a high dynamic threshold) based on which heating element was active during the last heating cycle(s) (step 910). In some embodiments, the electronic processor 160 only determines one of the dynamic thresholds (e.g., the low dynamic threshold or the high dynamic threshold) instead of determining both thresholds. After at least one dynamic threshold has been determined, the electronic processor 160 operates the lower heating element 145 according to the determined dynamic threshold(s) as described in FIG. 8 (step 915).

Figure 12:
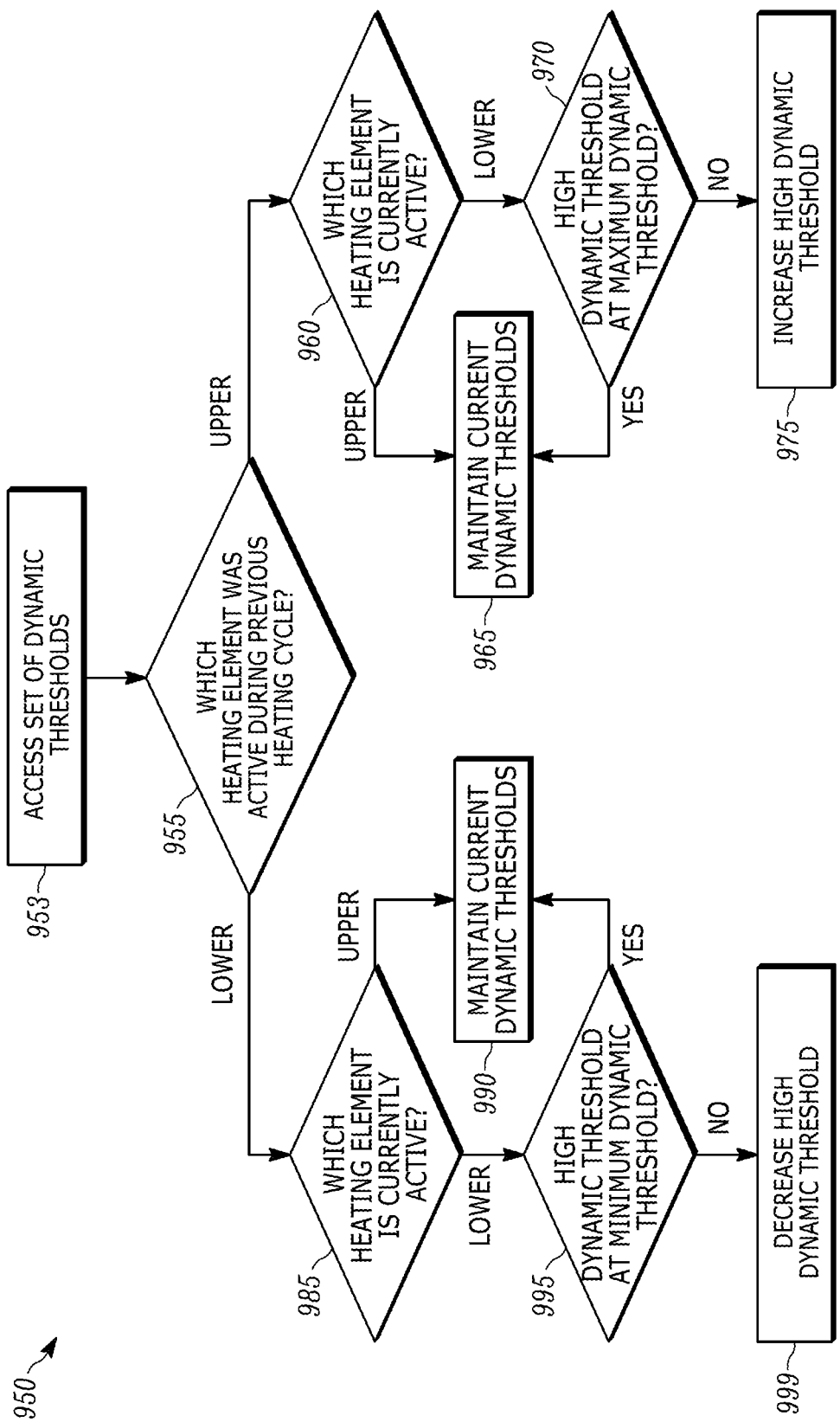
FIG. 12 is a flowchart illustrating a method of operating the water heater of FIG. 1 according to some embodiments of the application.

FIG. 12 is a flowchart illustrating a process, or method, 950 for determining the dynamic thresholds based on which heating elements have been previously activated. It should be understood that the order of the steps disclosed in process 950 could vary. Additional steps may also be added to the control sequence and not all of the steps may be required. As shown in FIG. 12, the electronic processor 160 accesses a low dynamic threshold and a high dynamic threshold, for example, from the memory 207 (step 953). The low and high dynamic thresholds are bound by a minimum dynamic threshold and a maximum dynamic threshold. These maximum and minimum thresholds provide water at a temperature acceptable to the user. The electronic processor 160 determines which heating element 140, 145 was activated during the last heating cycle (step 955). When the electronic processor 160 determines that the upper heating element 140 was activated during the last heating cycle, the electronic processor 160 determines which heating element 140, 145 is currently active (step 960). When the electronic processor 160 determines that the upper heating element 140 is currently active (i.e., the upper heating element 145 is active for at least two consecutive heating cycles), the electronic processor 160 maintains the dynamic thresholds unchanged (step 965). On the other hand, when the electronic processor 160 determines that the lower heating element 145 is currently activated, the electronic processor 160 then determines whether the high dynamic threshold is at the maximum dynamic threshold (step 970). The switch from operating the upper heating element 140 to operating the lower heating element 145 indicates that excess energy has been shed and water output to the user may be colder than expected. When the electronic processor 160 determines that the high dynamic threshold is at the maximum dynamic threshold, the electronic processor 160 maintains the high dynamic threshold the same (step 965). On the other hand, when the electronic processor 160 determines that the high dynamic threshold is not at the maximum dynamic threshold, the electronic processor 160 increases the high dynamic threshold to approach the maximum dynamic threshold (step 975).

Referring back to step 955, when the electronic processor 160 determines that the lower heating element 145 was the heating element activated during the previous heating cycle, the electronic processor 160 proceeds to determine which heating element is currently active (step 985). When the electronic processor 160 determines that the upper heating element 140 is activated (e.g., the lower heating element 145 was previously activated and the upper heating element 140 is currently activated), the electronic processor 160 maintains the dynamic threshold obtained from memory (step 990). On the other hand, when the electronic processor 160 determines that the lower heating element 145 is currently activated (e.g., the lower heating element 145 was activated for two consecutive heating cycles), the electronic processor 160 determines whether the high dynamic threshold is at the minimum dynamic threshold (step 995). The consecutive operation of the lower heating element 145 in the previous and present heating cycles indicates that an insufficient amount of energy is being "shed" by the water heater 100 resulting in a waste of energy resources. When the electronic processor 160 determines that the high dynamic voltage threshold is at the minimum dynamic threshold, the electronic processor maintains the minimum dynamic threshold as the high dynamic threshold (step 990). On the other hand, when the electronic processor 160 determines that the high dynamic threshold is not at the minimum dynamic threshold, the electronic processor proceeds to decrease the high dynamic threshold (step 999). FIG. 13 is a graph illustrating the change in the dynamic thresholds when performing the method of FIG. 12. As shown in FIG. 13, the low and high dynamic thresholds continue to decrease over time until the high dynamic threshold reaches the minimum dynamic threshold.

In some embodiments, the minimum and maximum dynamic thresholds are determined according to a participation level of a user. For example, a user selects to participate in grid controlled operation of the water heater 100, which allows the water heater 100 to operate, for example, in the third mode (e.g., reduced mode). However, there may be situations when operating in the reduced mode causes the user to run out of hot water. Such a situation may decrease overall participation in controlling the water heaters 100 based on information about the electrical grid. Therefore, it may be beneficial to provide more flexibility in the levels of participation for each user. That is, rather than having a user select between grid operation and non-grid operation, a user may be able to select one level of participation from, for example but not limited to, ten levels of participation. As the level of participation selected by the user increases, the minimum dynamic threshold decreases thereby allowing a greater amount of energy to be shed when the water heater 100 operates in the third mode. For example, FIG. 14 illustrates a graph showing the inversely proportional relationship between the participation levels and the minimum dynamic threshold. As shown in the graph of FIG. 14, the maximum level of participation corresponds to the minimum dynamic threshold with the lowest temperature. The graph of FIG. 14 illustrates the minimum dynamic threshold decreasing linearly with respect to changes in the level of participation. In other embodiments, however, the change between one level of participation and the next level of participation may not be linear. Rather, the change among levels of participation may be exponential, logarithmic, logistic, and/or a similar relationship.

Figure 15:
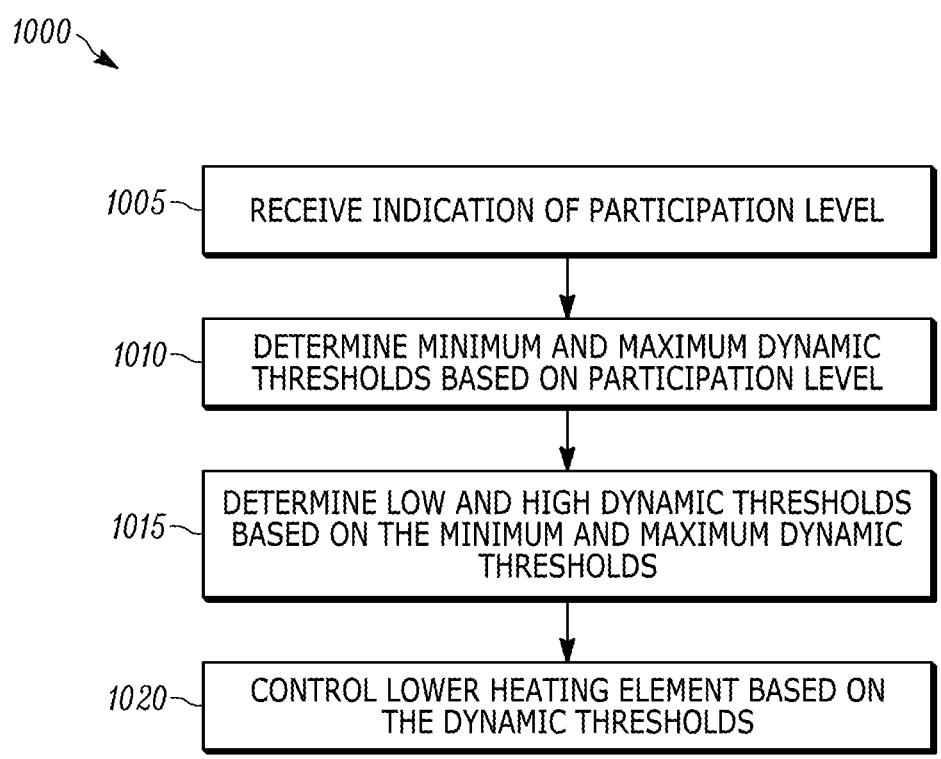
FIG. 15 is a flowchart illustrating a method of operating the water heater of FIG. 1 according to some embodiments of the application.

FIG. 15 is a flowchart illustrating a process, or method, 1000 of determining the minimum and maximum dynamic thresholds based on a participation level. It should be understood that the order of the steps disclosed in process 1000 could vary. Additional steps may also be added to the control sequence and not all of the steps may be required. In some embodiments, such as the one shown in FIG. 15, the minimum dynamic threshold and the maximum dynamic thresholds are also adaptive. As shown in FIG. 15, the electronic processor 160 receives an indication of the participation level from the user associated with the water heater 100 (step 1005). The electronic processor 160 may receive the indication of the participation level through, for example, the input/output devices 217. In other embodiments, the water heater 100 is communicatively coupled with a remote user interface via, for example, a Wi-Fi network. In such embodiments, the user may elect the participation level through the remote user interface (e.g., a computing device, a smartphone, a laptop computer, a tablet computer, a remote wireless control panel, and the like). The water heater 100, and specifically a second communication interface included in the control circuit 200, receives the participation level for the user and communicates the selected participation level to the electronic processor 160.

After receiving the indication of the participation level, the electronic processor 160 determines a minimum dynamic threshold and a maximum dynamic threshold based on the participation level (step 1010). For example, in one embodiment, the electronic processor 160 uses a look-up table to determine which minimum and/or maximum dynamic threshold corresponds to the indicated participation level. The electronic processor 160 then determines a low dynamic threshold and a high dynamic threshold based on the minimum and/or maximum dynamic thresholds corresponding to the participation level (step 1015). For example, after determining the minimum and/or maximum dynamic threshold, the electronic processor 160 may implement the method of FIG. 13 to determine a low and/or high dynamic threshold. The electronic processor 160 then controls the lower heating element 145 according to the determined low and high dynamic thresholds, as described in, for example, FIG. 8 (step 1020).

Figure 16:
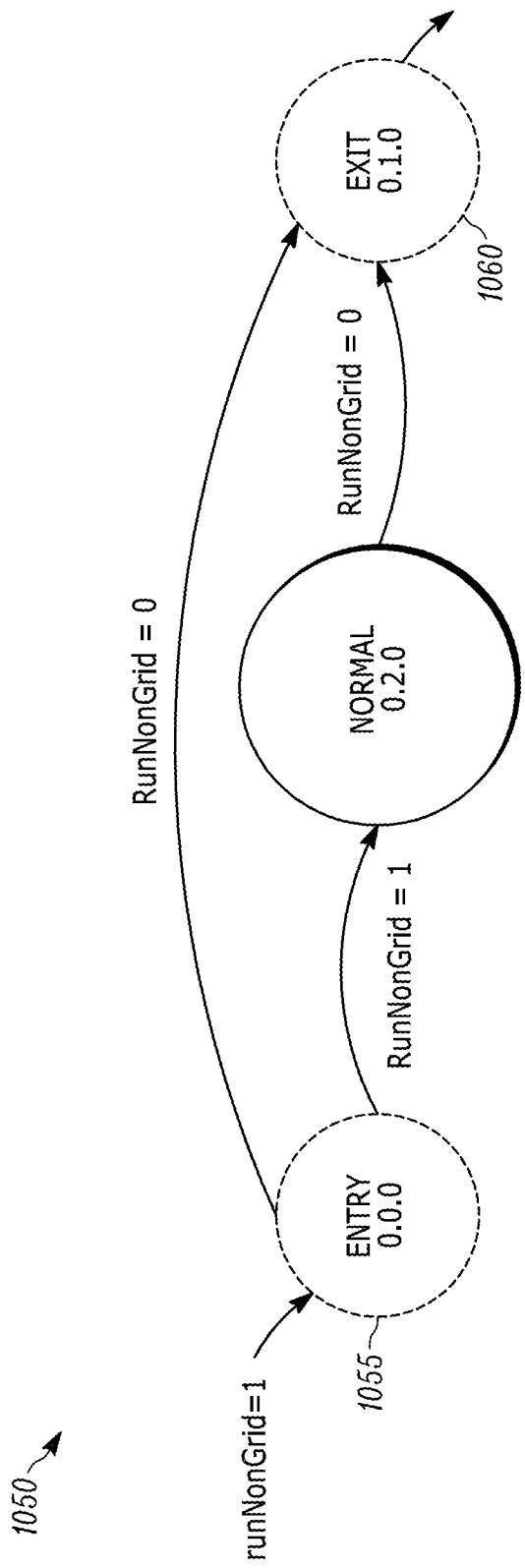
FIG. 16 is a state diagram illustrating a method of operation of the water heater of FIG. 1 in a normal mode.

In some embodiments, the operation of the water heater is better described via state diagrams. FIG. 16 illustrates a state diagram 1050 for the operation of the water heater 100 in a normal mode. The operation of the water heater 100 in the normal mode is based on the value for the parameter "runNongrid," which indicates whether the water heater 100 receives any commands from the grid controller 230. The water heater 100 enters in the normal mode at an entry state 1055 while the water heater 100 does not receive command from the communication interface 205, that is, while the runNongrid parameter is one or high. When the parameter runNongrid changes state (that is, when the water heater 100 receives a command or instruction from the grid controller 230), the water heater 100 exits the normal mode via an exit state 1060. This state diagram is similar to the description of the operation of the water heater 100 of FIG. 3. While the water heater 100 operates in the normal mode, the water heater 100 may behave as described above with respect to FIG. 4. While the water heater 100 operates in the normal mode, the electronic processor 160 may generate a report of the status of the water heater 100. During the normal mode, the status of the water heater 100 may alternate between being idle in the normal mode or heating in the normal mode.

Figure 17:
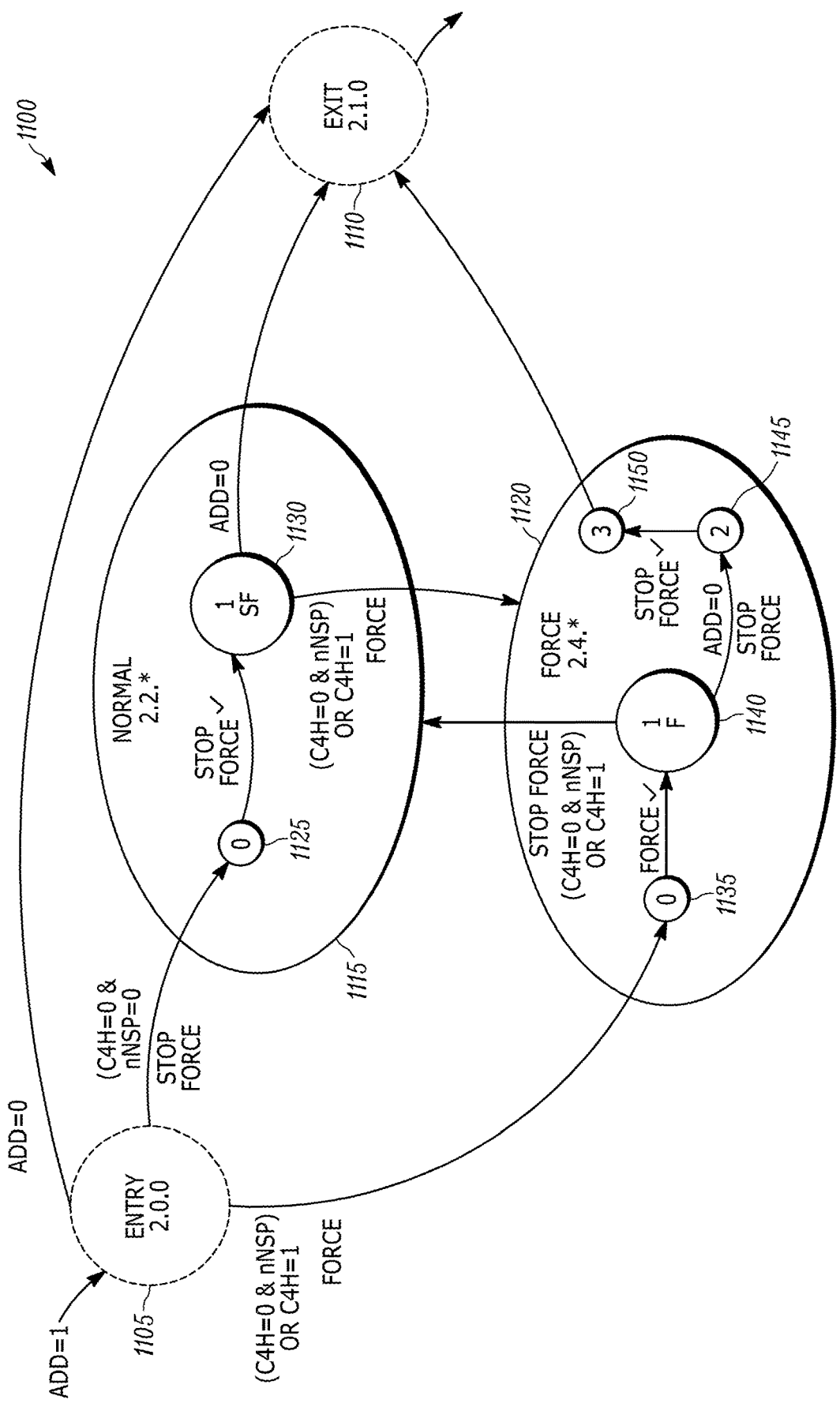
FIG. 17 is another state diagram illustrating a method of operation of the water heater of FIG. 1 in a second mode.

FIG. 17 illustrates another state diagram 1100 illustrating the operation of the water heater 100 in the second mode. As shown in FIG. 17, the state diagram 1100 includes four states: an entry state 1105, an exit state 1110, a normal state 1115, and a force state 1120. The transitions between the four states are determined by three parameters. An "add" parameter indicates whether the electronic processor 160 receives an Add Load command through the communication interface 205, as described above with reference to FIGS. 5-7. In the illustrated embodiment, when the add parameter is zero, the electronic processor 160 does not receive the Add Load command and when the add parameter is one, the electronic processor 160 receives the Add Load command through the communication interface 205. A call for heat "C4H" parameter indicates whether the heating elements 140, 145 are operating (that is, whether the water heater 100 is currently heating water). In the illustrated embodiment, when the C4H parameter is set to zero, the heating elements 140, 145 are not activated, and when the C4H parameter is set to one, at least one of the heating elements 140, 145 is activated. A not near setpoint "nNSP" parameter indicates whether the upper temperature is above the intermediary threshold discussed with reference to FIGS. 5-7. In the illustrated embodiment, when the nNSP parameter is set to zero, the upper temperature is below the intermediary threshold, and when the nNSP is set to one, the upper temperature is above the intermediary threshold.

The electronic processor 160 of the water heater 100 enters the second mode when the electronic processor 160 receives an Add Load command through the communication interface 205 (e.g., add is set to one). From operating in the entry state 1105, the electronic processor 160 may switch to the exit state 1110, the normal state 1115, or the force state 1120. The electronic processor 160 switches from the entry state 1105 to the exit state 1110 when the Add Load command from the grid controller 230 is no longer received (e.g., the add parameter is set to zero). The electronic processor 160 switches from the entry state 1105 to the normal state 1115 when the heating elements 140, 145 are inactive (e.g., C4H is set to zero) and the upper temperature is above the intermediary threshold (e.g., nNSP is set to zero). Since the upper temperature is above the intermediary threshold, no forced heating of the water is required as described, for example, with reference to FIGS. 6 and 7. The electronic processor 160 switches from the entry state 1105 to the force state 1120 when the heating elements 140, 145 are activated (e.g., C4H is set to one) or when the heating elements 140, 145 are still inactive but the upper temperature drops below the intermediary threshold (e.g., C4H is set to zero but nNSP is set to one). Because the heating elements 140, 145 are activated (or about to be activated since the upper temperature dropped below the intermediary threshold), the electronic processor 160 enables "forced heating" of the water.

In the illustrated embodiment, the normal state 1115 includes two substates 1125. 1130. In other embodiments, however, the normal state 1115 includes more or less substates. In the first substate 1125, the electronic processor 160 verifies that "forced heating" is disabled since the upper temperature is above the intermediary threshold and the heating elements 140, 145 are inactive (e.g., C4H and nNSP are set to zero). While in the second substate 1130, the water heater 100 remains idle, but the electronic processor 160 monitors the upper temperature and whether the heating elements 140, 145 become activated. The electronic processor 160 switches from the normal state 1115 to the exit state 1110 when the electronic processor 160 stops receiving the Add Load command (e.g., add is set to zero). The electronic processor 160 switches from the normal state 1115 to the force state 1120 when one of the heating elements 140, 145 becomes activated (e.g., C4H is set to one) or when the heating elements 140, 145 remain inactive, but the upper temperature drops below the intermediary threshold (e.g. C4H is set to zero, but nNSP is set to one). In other words, the electronic processor 160 operates in the normal state 1115 while the water temperature remains near the desired threshold (e.g., the upper temperature is above the intermediary threshold and the lower temperature is above the turn-on threshold as discussed with respect to FIG. 7).

The electronic processor 160 operates in the force state 1120 when the water temperature is lower than the intermediary or turn-on thresholds or while heating is taking place. In the illustrated embodiment, the force state 1120 includes four substates 1135, 1140, 1145, and 1150. The first substate 1135 operates as an entry substate for the force state 1120, and the electronic processor 160 verifies that forced heating is enabled when the heating elements 140, 145 are activated (e.g., C4H is set to one) or when the heating elements 140, 145 are still inactive, but the upper temperature drops below the intermediary threshold (e.g., C4H is set to zero, but nNSP is set to one). After the electronic processor 160 verifies the water temperature and the state of the heating elements, the electronic processor 160 switches to the second substate 1140. During the second substate 1140, the electronic processor 160 enables forced heating as described above with respect to FIGS. 6 and 7. During the second substate 1140, the water heater 100 uses excess energy from the electrical grid to keep the water temperature higher than normal. The electronic processor 160 switches from the second substate 1140 to the normal state 1110 when the heating elements 140, 145 are disabled and the upper temperature rises above the turn-off threshold as shown in FIG. 7 (e.g., C4H and nNSP are set to zero). The electronic processor 160 switches from the second substate 1140 to the third substate when the electronic processor 160 ceases to receive the Add Load command from the grid controller 230 (e.g., add is set to zero). The electronic processor 260 then verifies that the Add Load command is not received through the communication interface 205 and switches to the fourth substate 1150 after verification. The fourth substate 1150 serves as the exit substate for the force state 1120. From the fourth substate 1150, the electronic processor 160 switches to the exit state 1110, and the water heater 100 exits the second mode.

During the second mode, the status of the water heater 100 may alternate between being idle and heightened. The water heater 100 has a status of idle while the electronic processor 160 operates in the normal state 1115, and the water heater 100 has a status of heightened while the electronic processor 160 operates in the force state 1120 during which excess energy in the grid is utilized to heat the water in the water heater 100.

Figure 18:
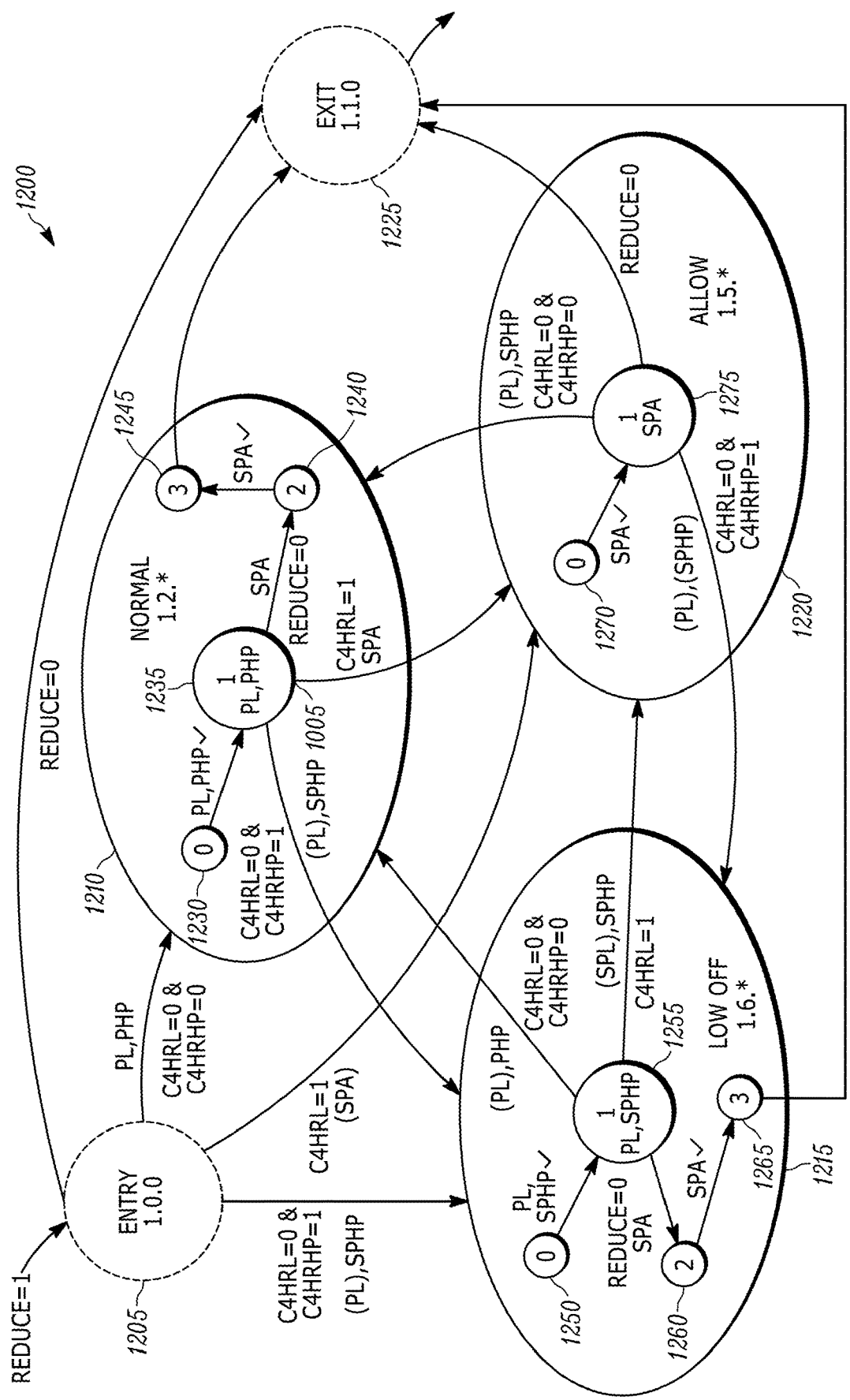
FIG. 18 is another state diagram illustrating a method of operation of the water heater of FIG. 1 in a third mode.

FIG. 18 illustrates a third state diagram 1200 illustrating the operation of the water heater 100 in the third mode. As shown in FIG. 18, the third mode utilizes five states: an entry state 1205, a normal state 1210, a low off state 1215, an allow state 1220, and an exit state 1225. The transitions between the five states depend on three parameters. A "reduce" parameter indicates whether the electronic processor 160 receives a Reduce command through the communication interface 205, as described above with reference to FIGS. 8-10. In the illustrated embodiment, when the reduce parameter is zero, the electronic processor 160 does not receive the Reduce command, and when the reduce parameter is one, the electronic processor 160 receives the Reduce command through the communication interface 205. A call for heat lower "C4HRL" parameter indicates whether the lower temperature is below a turn-on threshold for the lower heating element 145 (e.g., with respect to FIG. 10, the turn-on threshold for the lower heating element 145 corresponds to the low dynamic threshold). In the illustrated embodiment, when the C4HRL parameter is set to zero, the lower temperature is above the turn-on threshold for the lower heating element 145 (that is, above the low dynamic threshold), and when the C4HRL is set to one, the lower temperature is below the turn-on threshold for the lower heating element 145 (that is, lower than the low dynamic threshold). The heat pump call for heat "C4HRHP" parameter indicates whether the upper temperature is below the turn-on threshold for the upper heating element 140. In the illustrated embodiment, when the C4HRHP parameter is set to zero, the upper temperature is above the turn-on threshold for the upper heating element 140, and when the C4HRHP parameter is set to one, the upper temperature is below the turn-on threshold for the upper heating element 140.

The electronic processor 160 of the water heater 100 enters the third mode (e.g., enters the entry state 1205) in response to receiving a reduce command through the communication interface 140 (e.g., reduce is set to one). The electronic processor 160 switches from the entry state 1205 to the normal state 1210 when the lower and upper temperatures are above their respective turn-on thresholds (e.g., C4HRL and C4HRHP are set to zero). The electronic processor 160 switches from the entry state to the low off state 1215 when the lower temperature is above the turn-on threshold for the lower heating element 145, but the upper temperature is below the turn-on threshold for the upper heating element 140 (e.g., C4HRL is set to zero, but C4HRHP is set to one). The electronic processor 160 switches from the entry state 1205 to the allow state 1220 when the lower temperature is below the turn-on threshold for the lower heating element 145 (e.g., C4HRL is set to one).

As illustrated in FIG. 18, the normal state 1210 includes a first substate 1230, a second substate 1235, third substate 1240, and a fourth substate 1245. The electronic processor 160 operates in the normal state 1210 when the water in the entire tank is above its respective turn-on threshold. With reference to FIG. 10, the electronic processor 160 operates in the normal state 1210 between times $T_{21}$ and $T_{23}$. When the electronic processor 160 transitions into the normal state 1210, the electronic processor 160 defaults to the first substate 1230, which functions as an entry state for the normal state 1210. The electronic processor 160 transfers from the first substate 1230 after verifying that the lower temperature and upper temperature are above the turn-on thresholds for the lower heating element 145 and the upper heating element 140, respectively. While in the second substate 1235, the heating elements 140, 145 and the heat pump 705, if one is available, are deactivated, and the water heater 100 is considered to be idle. The electronic processor 160 switches from the second substate 1235 to the low off state 1215 when the upper temperature drops below the turn-on threshold for the heat pump 705 but the lower temperature still remains above the turn-on threshold for the lower heating element 145 (e.g., C4HRL is set to zero and C4HRHP is set to one). The electronic processor 160 switches from the second substate 1235 to the allow state 1220 when the lower temperature drops below the turn-on threshold for the lower heating element (e.g., C4HRL is set to one). The lower temperature may drop due to, for example, a large draw of water such as illustrated in FIG. 10. The electronic processor 160 switches from the second substate 1235 to the third substate 1240 when the electronic processor 160 ceases to receive the reduce command (e.g., reduce is set to zero) through the communication interface 205. While in the third substate 1240, the electronic processor 160 verifies that the reduce command is no longer received. After verifying that the reduce command is no longer received, the electronic processor 160 switches to the fourth substate 1245, and switches again to the exit state 1225.

As illustrated in FIG. 18, the low off state 1215 includes a first substate 1250, a second substate 1255, a third substate 1260, and a fourth substate 1265. The electronic processor 160 operates in the low off state when the lower water temperature is still, for example, warm, but the upper temperature is too cold. With reference to FIG. 10, the electronic processor 160 operates in the low off state between times $T_{23}$ and $T_{26}$. When entering the low off state 1215, the electronic processor 160 begins at the first substate 1250 during which the electronic processor verifies that the lower temperature remains above the turn-on threshold for the lower heating element 145 and the upper temperature is below the turn-on threshold for either the upper heating element 140 or the heat pump 705, if one is available (e.g., C4HRL is set to zero, but C4HRHP is set to one). After verifying the lower temperature, the electronic processor 160 switches to the second sub state 1255 during which the heat pump 705, if one is available, or the upper heating element 140 is activated. From the second substate 1255, the electronic processor 160 switches to the normal state 1210 when the upper temperature rises to be above the turn-off threshold for the heat pump 705, if one is available, and/or the upper heating element 140 (e.g., C4HRL and C4HRHP are set to zero). From the second substate 1255, the electronic processor 160 switches to the allow state 1220 when the upper temperature remains below the turn-on threshold for the upper heating element 140 or the heat pump 705, if one is available, and the lower temperature also drops below the turn-on threshold for the lower heating element 145 (e.g., C4HRL and C4HRHP are set to one). From the second substate 1255, the electronic processor 160 switches to the third substate 1260 when the electronic processor 160 ceases to receive the reduce command (e.g., reduce is set to zero). At the third substate 1260, the electronic processor 160 verifies that the reduce command is no longer active, and switches to the fourth substate 1265 from which the electronic processor 160 switches to the exit state 1225.

FIG. 18 also illustrates that the allow state 1220 includes a first substate 1270 and a second substate 1275. The electronic processor 160 operates in the allow state when the water in the tank is cold. For example, with reference to FIG. 10, the electronic processor 160 operates in the allow state 1220 when the upper temperature is below the turn-on threshold (e.g., after $T_{25}$) and when the lower temperature is below the turn-on threshold for the lower heating element 145, for example, the low dynamic threshold (e.g., at $T_{26}$). When entering the allow state 1220, the electronic processor 160 starts at the first substate 1270. While in the first substate 1270, the electronic processor 160 verifies that both the upper temperature and the lower temperature are below the turn-on thresholds for the upper heating element 140 or heat pump 705, if one is available, and the lower heating element 145, respectively. After the electronic processor 160 verifies the state of the water, the electronic processor 160 switches to the second substate 1275 during which both the lower heating element 145, the upper heating element 140, and/or the heat pump 705, when available, are activated to bring the water temperature to a minimum water temperature threshold. From the second substate 1275, the electronic processor 160 switches to the normal state 1210 when the upper temperature rises above the turn-off threshold for the upper heating element 140 and/or the heat pump 705, if one is available, and the lower temperature rises above the turn-off threshold for the lower heating element 145, for example, the high dynamic threshold (e.g., C4HRL and C4HRHP are set to zero). From the second substate 1275, the electronic processor 160 switches to the low off state 1215 when the lower temperature rises above the turn-off threshold for the lower heating element 145, but the upper temperature remains below the turn-on threshold for the upper heating element 140 and/or the heat pump 705, if one is available. The electronic processor 160 switches to the exit state 1225 when the electronic processor 160 ceases to receive the reduce command (e.g., reduce is set to zero) through the communication interface 205. While operating in the third mode, the status of the water heater 100 alternates between idle and connected to the grid (for example, while in the normal state 1210) and curtailed (for example, while in the low off state 1215).

Figure 19:
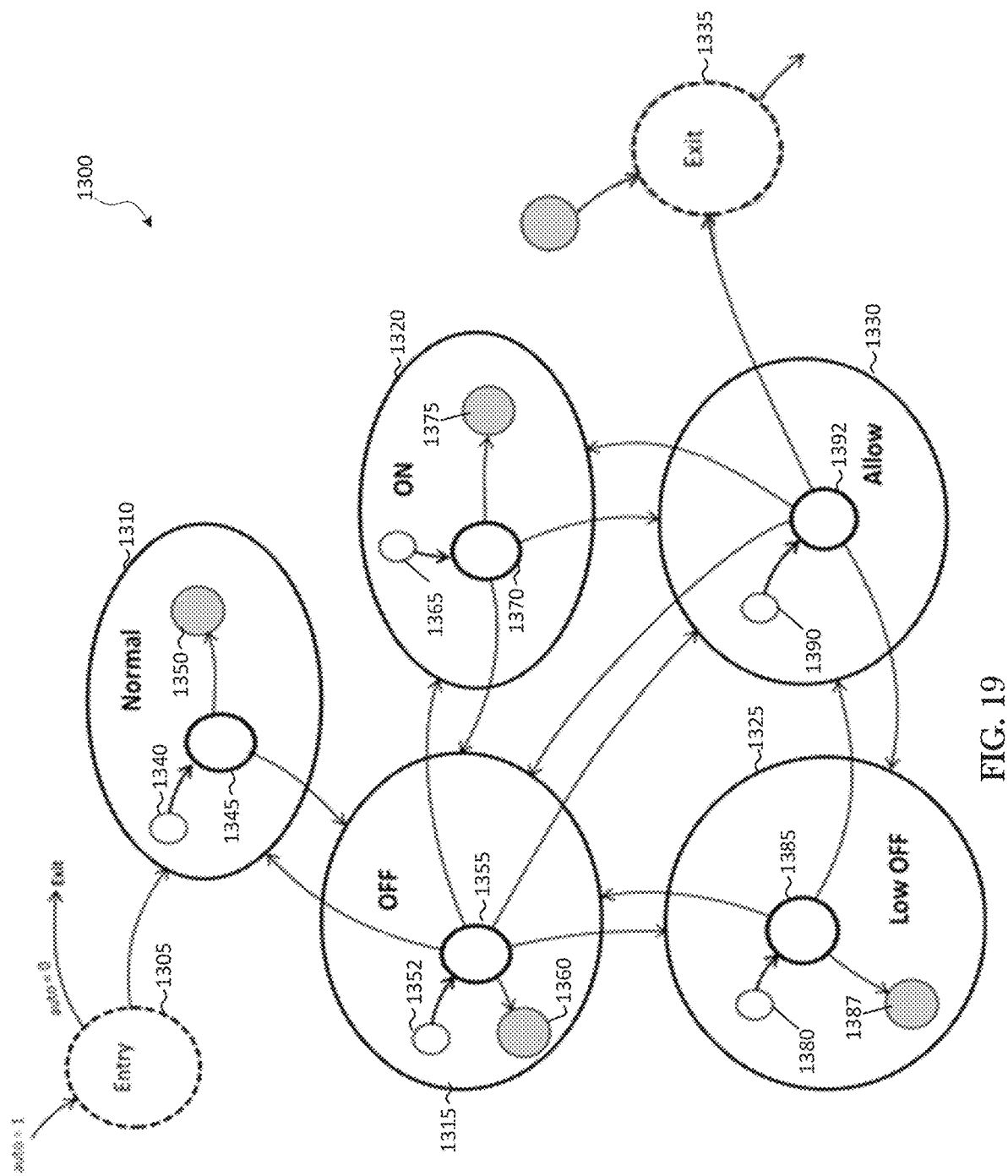
FIG. 19 is another state diagram illustrating a method of operation of the water of FIG. 1 in an autonomous mode.

FIG. 19 illustrates a state diagram 1300 that illustrates the operation of the water heater 100 in an autonomous mode.

While the water heater 100 operates in the autonomous mode, the water heater 100 may not necessarily wait for specific commands from the grid controller 230, but may instead monitor the temperature of the tank 105 and change states based upon which elements 140, 145 are to be activated. In the autonomous mode, the electronic processor 160 switches between seven different states: an entry state 1305, a normal state 1310, an off state 1315, an on state 1320, a low off state 1325, an allow state 1330, and an exit state 1335. The electronic processor 160 switches between these states based on five different parameters. A call for heating for heat pump "C4HRHP" parameter indicates whether the upper temperature has dropped below the turn-on threshold for the upper heating element 140 or a heat pump 705, if one is available. In the illustrated embodiment, the C4HRHP is set to one when the upper temperature drops below the turn-on threshold for the upper heating element 140 and/or the heat pump 705, if one is available, and the C4HRHP is set to zero when the upper temperature is above the turn-off threshold for the upper heating element 140 or the heat pump 705, if one is available. A call for heat lower "C4HRL" parameter indicates whether the lower temperature is below the turn-on threshold for the lower heating element 145. In the illustrated embodiment the C4HRL is set to one when the lower temperature drops below the turn-on threshold for the lower heating element 145, and the C4HRL is set to zero when the lower temperature rises above the turn-off threshold for the lower heating element 145. The not near setpoint "nNSP" parameter indicates whether the upper temperature is above the intermediary threshold discussed with reference to FIGS. 5-7. In the illustrated embodiment, the nNSP is set to one when the upper temperature is below the intermediary threshold, and is set to zero when the upper temperature is above the turn-off threshold for the upper heating element 140. The call for heat "C4H" parameter indicates whether any of the heating elements 140, 145 are operating. In the illustrated embodiment C4H is set to one when at least one of the heating elements 140, 145 is operating, and is set to zero when the heating elements 140, 145 are deactivated. A duty cycle "DC" parameter indicates whether the duty cycle of the water heater 100 is greater than zero. In the illustrated embodiment, the DC parameter is set to zero when the duty cycle for the water heater is zero, and is set to one otherwise.

The electronic processor 160 enters the autonomous mode when the electronic processor 160 receives an autonomous command (e.g., auto is set to one). The electronic processor 160 starts at the entry state 1305. When the electronic processor 160 determines that the lower temperature is above the turn-on threshold for the lower heating element 145 and the upper temperature is above the turn-on threshold for the upper heating element 140 or the heat pump 705, if one is available (e.g., C4HRL and C4HRHP are set to zero), the electronic processor 160 transfers from the entry state 1305 to the normal state 1310. During the normal state 13010, the water heater 100 may be idle. As shown in FIG. 19, the normal state 1310 includes three substates 1340, 1345, 1350. When the electronic processor 160 enters the normal state 1310, the electronic processor 160 starts at the first substate 1340. After the electronic processor 160 verifies that the lower and upper temperatures are both above the turn-on threshold for their respective heating elements, the electronic processor 160 switches from the first substate 1340 to the second substate 1345. From the second substate 1345, the electronic processor 160 switches to the off state 1315 when the upper temperature is above the turn-on threshold for the upper heating element 140 (e.g., nNSP is set to zero) or when either of the heating elements 140, 145 are activated (e.g., C4H is set to one). The electronic processor 160 also transfers from the second substate 1340 to the third substate 1350 when the auto parameter is set to zero. From the third substate 1350, the electronic processor 160 may exit the normal state 1310.

As shown in FIG. 19, the off state 1315 includes three substates 1352, 1355, and 1360. When the electronic processor 160 enters the off state 1315, the electronic processor 160 starts at the first substate 1352. While in the first substate, the electronic processor 160 verifies that the lower and upper temperatures are both above the turn-on threshold for the lower and upper heating elements 140, 145, respectively, and that at least one of the heating elements 140, 145 is activated. After verification, the electronic processor 160 switches to the second substate 1355, during which the electronic processor 160 deactivates the heating elements 140, 145 and the heat pump 705, if one is available. From the second substate 1355, the electronic processor 160 switches back to the normal state 1310 when the heating elements 140, 145 become inactive. The electronic processor 160 also transfers to the on state 1320 when the duty cycle of the water heater 100 increases (e.g., DC is set to one). From the second substate, the electronic processor 160 switches to the allow state 1330 when the lower temperature drops below the turn-on threshold for the lower heating element 145 (e.g., C4HRL is set to one). The lower temperature may experience such a dramatic drop when, for example, a large water draw occurs. When the upper temperature drops below the turn-on threshold for the upper heating element 145 or the heat pump 705, if one is available (e.g., C4HRHP is set to one), the electronic processor 160 transfers to the low off state 1325. Otherwise, when the autonomous mode is deactivated (e.g., auto is set to zero), the electronic processor 160 switches to the third substate 1360 and proceeds to exit state 1335.

The on state 1320 also includes three substates 1365, 1370, 1375. The electronic processor 160 enters the on state when the duty cycle of the water heater 100 increases. When the electronic processor 160 enters the on state 1320, the electronic processor 160 begins on the first substate 1365, during which the electronic processor 160 verifies that no forced heating is enabled (e.g., SF command). The electronic processor 160 then transfers to the second substate 1370. From the second substate 1370, the electronic processor 160 transfers back to the off state 1315 when the duty cycle of the water heater 100 decreases (e.g., DC is set to zero). The electronic processor 160 may alternatively transfer to the allow state 1330 when the lower temperature drops below the turn-on threshold for the lower heating element 145 (e.g., C4HRL is set to one). Additionally, the electronic processor 160 may transfer to the third substate 1375 when the autonomous mode is deactivated (e.g., auto is set to zero), after which the electronic processor 160 transfers to the exit state 1335.

The low off state 1325 includes three substates 1380, 1385, 1387. The electronic processor 160 enters the low off state 1325 when the lower temperature remains above the turn-on threshold for the lower heating element 140, but the upper temperature drops below the turn-on threshold for the upper heating element 145 or the heat pump 705, if one is available. When the electronic processor 160 enters the low off state 1325, the electronic processor 160 starts at the first substate 1380 in which the electronic processor 160 verifies the temperature values. From the first substate 1380, the electronic processor 160 transfers to the second substate 1385 in which the lower heating element 145 is deactivated, but the upper heating element 140 or the heat pump 705, if one is available, are activated to heat the water in the upper portion of the water tank. From the second substrate, the electronic processor 160 transfers to the off state 1315 when the lower temperature remains above the turn-on threshold for the lower heating element 145, the upper temperature rises above the turn-off threshold for the upper heating element 140 or the heat pump 705, if one is available, and the duty cycle of the water heater 100 decreases (e.g., C4HRL, C4HRHP, and DC are all set to zero). From the second substrate 1385, the electronic processor 160 transfers to the allow state 1330 when the lower temperature drops below the turn-on threshold for the lower heating element 140 (e.g., C4HRL is set to one). When the autonomous mode is disabled (e.g., auto is set to zero), the electronic processor 160 transfers from the second substrate 1385 to the third substrate 1387 and proceeds to the exit state 1335.

The allow state 1330 only includes two substates 1390, 1392. The electronic processor 160 enters the allow state 1330 when the overall (average) water temperature of the water heater 100 (specifically, the water of the water tank 105) has dropped and both heating elements 140, 145 are now activated to replenish the lost hot water. When entering the allow state 1330, the electronic processor 160 starts at the first substate 1390, in which the electronic processor 160 verifies the water temperature information. The electronic processor 160 then proceeds to the second substate 1392 during which the lower heating element 145 and the upper heating element 140 or the heat pump 705, if one is available, are activated. From the second substate 1392, the electronic processor 160 transfers to the low off state when the lower temperature rises above the turn-off threshold for the lower heating element 145, but the upper temperature remains below the turn-off threshold for the upper heating element 140 or the heat pump 705, if one is available. The electronic processor 160 can alternatively transfer to the off state 1315. The electronic processor 160 also transfers to the on state 1320 when the lower temperature rises above the turn-off threshold for the lower heating element 145, and the upper temperature also rises above the turn-off threshold for the upper heating element 140 or the heat pump 705, if one is available, and the duty cycle of the water heater 100 increases (e.g., C4HRL and C4HRHP are set to zero and DC is set to one). Additionally, when the autonomous mode is disabled (e.g., auto is set to zero), the electronic processor 160 transfers from the second substate 1392 to the exit state 1335. Upon reaching the exit state 1335, the electronic processor 160 exits the autonomous mode. During the autonomous mode, the status of the water heater 100 switches between being idle and connected to the grid (during for example, the normal state 1310, the off state 1315, and the on state 1320), being heightened (during, for example, the allow state 1330), and being curtailed (during, for example, the low off state 1325).

The electronic processor 160 may also implement an emergency shut-off in which the electronic processor 160 disables all heating or activation of any heating elements 140, 145. The emergency shut-off may occur, for example, in response to a sensor detecting an abnormal condition of the water heater 100. Additionally, although the state diagrams have been described above as having a specific number of states and transitions, in some embodiments, each of the modes may be implemented using a different number of states and substates, and the connections between the states may be slightly different.

Thus, the invention provides, among other things, a grid controlled water heater operable to switch modes of operation based on commands received from a grid controller and dynamically determine thresholds based on past water usage and participation levels.

In the foregoing specification and accompanying drawings, one or more embodiments are described and illustrated. These embodiments are not limited to the specific details provided herein and may be modified in various ways. Furthermore, other embodiments may exist that are not described herein. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable media. Similarly, embodiments described herein may be implemented as non-transitory, computer-readable media storing instructions executable by one or more electronic processor to perform the described functionality.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," or "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A water heater system receiving electrical power from an electrical grid, the system comprising:
    a water tank having a vertical axis, an upper portion and a lower portion;
    an upper heating element;
    a lower heating element disposed below the upper heating element with respect to the vertical axis, the upper heating element and the lower heating element for heating water within the water tank;
    an upper temperature sensor configured to produce a first signal indicative of a water temperature within the upper portion;
    a lower temperature sensor configured to produce a second signal indicative of a water temperature within the lower portion;
    a control circuit including a transceiver and an electronic processor, wherein the transceiver is communicatively coupled to a grid controller and wherein the electronic processor is configured to:
        receive the first and second signals via the upper temperature sensor and the lower temperature sensor,
        control the upper heating element and lower heating element according to a first operation mode of the electronic processor,
        receive, via the transceiver, at least one of an add load command or a shed load command,
        upon receiving the add load command, control the upper heating element and lower heating element according to a second mode of the electronic processor, and
        upon receiving the shed load command, control the upper heating element and lower heating element according to a third mode of the electronic processor,
        wherein the electronic processor is configured, when in the first mode, to activate the lower heating element when the upper heating element is deactivated and the second signal indicates that the water temperature in the lower portion is below a predetermined turn-on threshold, and is configured to, when in the third mode, activate the lower heating element when the upper heating element is deactivated and the second signal indicates that the water temperature in the lower portion is below a low dynamic threshold.

2. The system of claim 1, wherein the electronic processor is further configured to:
    deactivate, when in the first or the second mode, the lower heating element when the second signal indicates that the water temperature in the lower portion exceeds a predetermined setpoint; and
    deactivate, when in the third mode, the lower heating element when the second signal indicates that the water temperature in the lower portion exceeds a high dynamic threshold.

3. The system of claim 2, wherein the system further comprises a heat pump positioned proximate to the lower heating element and configured to heat water within the water tank and wherein the electronic processor is further configured to:
    activate, when in the third mode, the heat pump when the second signal indicates that the water temperature in the lower portion falls below the predetermined turn-on threshold; and
    deactivate the heat pump when, in the third mode, the second signal indicates that the water temperature in the lower portion exceeds a deactivation threshold, the deactivation threshold being less than the predetermined setpoint.

4. The system of claim 1, wherein the electronic processor is further configured to activate the lower heating element in the second mode when the upper heating element is deactivated and the second signal indicates that the water temperature in the lower portion is below an intermediary threshold, and to deactivate the lower heating element in the second mode when the second signal indicates that the water temperature in the lower portion exceeds a predetermined setpoint, wherein the intermediary threshold is greater than the predetermined turn-on threshold and is less than the predetermined setpoint.

5. The system of claim 4, wherein the intermediary threshold is approximately the predetermined setpoint minus five degrees.

6. The system of claim 2, wherein the electronic processor is further configured to:
    determine, during the third mode of operation, that the lower heating element is currently active;
    determine which of the upper heating element and the lower heating element was activated during a previous heating cycle, and
    change at least one of the high and low dynamic thresholds based on which of the upper heating element and the lower heating element was activated during the previous heating cycle.

7. The system of claim 3, wherein the electronic processor is further configured to:
 monitor an average water temperature of the water within the water tank based on the first and second signal;
 activate, when in the first mode, the heat pump when the average water temperature falls below the predetermined turn-on threshold; and
 deactivate, when in the first mode, the heat pump when the average water temperature exceeds a difference threshold, the difference threshold being less than the predetermined setpoint.

8. The system of claim 6, wherein the electronic processor is configured to adjust the high dynamic threshold to be between a minimum dynamic threshold and a maximum dynamic threshold.

9. The system of claim 8, wherein the maximum dynamic threshold is between the predetermined turn-on threshold and the predetermined setpoint.

10. The system of claim 8, wherein the electronic processor is further configured to:
 receive a selected level of participation in a grid-controlled operation of the water heater system; and
 adjust the minimum dynamic threshold based on the selected level of participation.

11. A method of operating a water heater system configured to receive electrical power from an electrical grid, the water heater system including a water tank having a vertical axis, an upper portion and a lower portion; an upper heating element; a lower heating element disposed below the upper heating element with respect to the vertical axis, the upper heating element and the lower heating element for heating water within the water tank; an upper temperature sensor configured to produce a first signal indicating a water temperature within the upper portion; a lower temperature sensor configured to produce a second signal indicating a water temperature within the lower portion; a control circuit including a transceiver communicatively coupled to a grid controller and further including an electronic processor, the method comprising:
 receiving, via the transceiver, a shed load command;
 determining a low and a high dynamic threshold;
 determining whether the water temperature indicated by the second signal is less than the low dynamic threshold;
 activating the lower heating element in response to receiving the shed load command and determining that the water temperature indicated by the second signal is less than the low dynamic threshold;
 determining whether the water temperature indicated by the second signal exceeds the high dynamic threshold after activating the lower heating element; and
 deactivating the lower heating element in response to determining that the water temperature indicated by the second signal exceeds the high dynamic threshold.

12. The method of claim 11, wherein the system further includes a heat pump positioned proximate to the lower heating element and configured to heat water within the water tank and wherein the method further comprises:
 determining whether the water temperature indicated by the second signal is less than a turn-on threshold, the turn-on threshold being greater than the low dynamic threshold;
 activating the heat pump after receiving the shed load command and in response to determining that the water temperature indicated by the second signal is less than the turn-on threshold; and
 deactivating the heat pump when the water temperature indicated by the second signal exceeds a deactivation threshold.

13. The method of claim 11 further comprising:
 activating the lower heating element when the temperature of the water within the lower portion drops below the low dynamic threshold while the upper heating element is not activated;
 determining which of the upper heating element and the lower heating element was activated during a previous heating cycle; and
 increasing or decreasing the high dynamic threshold based on whether the upper heating element or the lower heating element was activated during the previous heating cycle.

14. The method of claim 13, further comprising adjusting the high dynamic threshold between a minimum dynamic threshold and a maximum dynamic threshold, wherein the high dynamic threshold is increased towards the maximum dynamic threshold when the upper heating element was active during the previous heating cycle and is decreased towards the minimum dynamic threshold when the lower heating element was active during the previous heating cycle.

15. The method of claim 14, further comprising:
 determining a selected level of participation in a grid-controlled operation of the water heater system; and
 adjusting the minimum dynamic threshold based on the selected level of participation.

16. The method of claim 15, wherein the minimum dynamic threshold is adjusted within a range having a maximum of one hundred and ten degrees Fahrenheit.

17. The method of claim 15, wherein the minimum dynamic threshold is adjusted within a range having a minimum of forty degrees Fahrenheit.

18. The method of claim 12, wherein the turn-on threshold is at least thirty-five degrees greater than the low dynamic threshold.

* * * * *